(12) United States Patent
Latulipe et al.

(10) Patent No.: US 11,283,376 B2
(45) Date of Patent: Mar. 22, 2022

(54) HYBRID ELECTRIC PROPULSION SYSTEM AND METHOD OF OPERATION

(71) Applicant: PRATT & WHITNEY CANADA CORP., Longueuil (CA)

(72) Inventors: Eric Latulipe, Ste-Julie (CA); Richard Freer, Saint-Basile-le-Grand (CA)

(73) Assignee: PRATT & WHITNEY CANADA CORP, Longueuil (CA)

(*) Notice: Subject to any disclaimer, the term of this patent is extended or adjusted under 35 U.S.C. 154(b) by 360 days.

(21) Appl. No.: 16/411,484

(22) Filed: May 14, 2019

(65) Prior Publication Data
US 2020/0083791 A1 Mar. 12, 2020

Related U.S. Application Data

(60) Provisional application No. 62/731,384, filed on Sep. 14, 2018, provisional application No. 62/729,818, (Continued)

(51) Int. Cl.
*H02P 6/12* (2006.01)
*B64D 35/08* (2006.01)
(Continued)

(52) U.S. Cl.
CPC ............... *H02P 6/12* (2013.01); *B60L 50/13* (2019.02); *B60L 50/51* (2019.02); *B60L 50/60* (2019.02);
(Continued)

(58) Field of Classification Search
CPC ........... H02P 6/12; B64D 35/00; B64D 35/02; B64D 35/08; G08C 19/38; H02K 47/04
See application file for complete search history.

(56) References Cited

U.S. PATENT DOCUMENTS

| 5,365,153 A | 11/1994 | Fujita et al. |
| 9,586,690 B2 | 3/2017 | Rajashekara et al. |

(Continued)

FOREIGN PATENT DOCUMENTS

| CN | 105158627 A | 12/2015 |
| CN | 107910934 A | 4/2018 |

OTHER PUBLICATIONS

Extended European Search Report dated Jan. 2, 2020 in connection with EP application No. 19195955.0, 6 pages.
(Continued)

*Primary Examiner* — Viet P Nguyen
(74) *Attorney, Agent, or Firm* — Norton Rose Fulbright Canada LLP

(57) ABSTRACT

A hybrid electric aircraft propulsion system and method of operation are described. The system comprises a thermal engine, a generator coupled to the thermal engine, a first electric propulsor operatively connected to the generator to receive alternating current (AC) electric power therefrom, a second electric propulsor, a generator inverter operatively connected to the generator to convert AC electric power to direct current (DC) electric power, and a first motor inverter operatively connected to the generator inverter and selectively connected to one of the first electric propulsor and the second electric propulsor and configured to receive the DC electric power and provide the first electric propulsor and the second electric propulsor with AC electric power, respectively.

16 Claims, 17 Drawing Sheets

Related U.S. Application Data filed on Sep. 11, 2018, provisional application No. 62/727,683, filed on Sep. 6, 2018, provisional application No. 62/727,673, filed on Sep. 6, 2018, provisional application No. 62/727,678, filed on Sep. 6, 2018, provisional application No. 62/727,681, filed on Sep. 6, 2018.

(51) Int. Cl.

| | | |
|---|---|---|
| *H02K 47/04* | (2006.01) | |
| *B64D 27/02* | (2006.01) | |
| *B64D 27/10* | (2006.01) | |
| *B64D 27/24* | (2006.01) | |
| *B64D 31/06* | (2006.01) | |
| *F01D 15/10* | (2006.01) | |
| *F02K 3/06* | (2006.01) | |
| *H02P 5/74* | (2006.01) | |
| *H02P 9/00* | (2006.01) | |
| *B64D 27/26* | (2006.01) | |
| *B64D 31/00* | (2006.01) | |
| *H02K 51/00* | (2006.01) | |
| *H02P 17/00* | (2006.01) | |
| *B60L 50/13* | (2019.01) | |
| *B60L 50/60* | (2019.01) | |
| *B60L 53/24* | (2019.01) | |
| *B60L 50/51* | (2019.01) | |
| *B64D 27/12* | (2006.01) | |
| *H02K 19/34* | (2006.01) | |
| *H02P 6/00* | (2016.01) | |
| *B64D 35/02* | (2006.01) | |
| *G08C 19/38* | (2006.01) | |
| *H02K 41/03* | (2006.01) | |
| *B64D 35/00* | (2006.01) | |
| *H02P 29/028* | (2016.01) | |
| *H02P 29/024* | (2016.01) | |
| *H02P 101/25* | (2016.01) | |
| *H02P 101/30* | (2015.01) | |
| *H02P 27/06* | (2006.01) | |

(52) U.S. Cl.

CPC .............. *B60L 53/24* (2019.02); *B64D 27/02* (2013.01); *B64D 27/10* (2013.01); *B64D 27/12* (2013.01); *B64D 27/24* (2013.01); *B64D 27/26* (2013.01); *B64D 31/00* (2013.01); *B64D 31/06* (2013.01); *B64D 35/00* (2013.01); *B64D 35/02* (2013.01); *B64D 35/08* (2013.01); *F01D 15/10* (2013.01); *F02K 3/06* (2013.01); *G08C 19/38* (2013.01); *H02K 19/34* (2013.01); *H02K 41/03* (2013.01); *H02K 47/04* (2013.01); *H02K 51/00* (2013.01); *H02P 5/74* (2013.01); *H02P 6/005* (2013.01); *H02P 9/008* (2013.01); *H02P 17/00* (2013.01); *H02P 29/025* (2013.01); *H02P 29/028* (2013.01); *B60L 2200/10* (2013.01); *B60L 2210/42* (2013.01); *B60L 2220/20* (2013.01); *B64D 2027/026* (2013.01); *F05D 2220/323* (2013.01); *F05D 2220/764* (2013.01); *H02K 2213/06* (2013.01); *H02P 27/06* (2013.01); *H02P 2101/25* (2015.01); *H02P 2101/30* (2015.01)

(56) References Cited

U.S. PATENT DOCUMENTS

| | | | |
|---|---|---|---|
| 9,764,848 | B1 | 9/2017 | Vondrell et al. |
| 9,882,513 | B2 | 1/2018 | Armstrong et al. |
| 9,937,803 | B2 | 4/2018 | Siegel et al. |
| 10,017,266 | B2 | 7/2018 | Phan et al. |
| 10,526,085 | B2 | 1/2020 | Fenny |
| 10,814,991 | B2 | 10/2020 | Shah et al. |
| 2007/0018035 | A1 | 1/2007 | Saiz et al. |
| 2013/0062455 | A1 | 3/2013 | Lugg et al. |
| 2013/0147204 | A1 | 6/2013 | Botti et al. |
| 2016/0340051 | A1 | 11/2016 | Edwards et al. |
| 2016/0365810 | A1* | 12/2016 | Armstrong ............ B64D 27/24 |
| 2017/0129617 | A1 | 5/2017 | Shah et al. |
| 2017/0166316 | A1 | 6/2017 | Zhou et al. |
| 2017/0190434 | A1 | 7/2017 | Dong et al. |
| 2017/0203839 | A1 | 7/2017 | Giannini et al. |
| 2017/0270513 | A1 | 9/2017 | Armstrong et al. |
| 2017/0275009 | A1 | 9/2017 | Huang |
| 2017/0320585 | A1 | 11/2017 | Armstrong et al. |
| 2017/0349293 | A1 | 12/2017 | Klemen et al. |
| 2017/0369179 | A1 | 12/2017 | Bradbrook |
| 2018/0050807 | A1 | 2/2018 | Kupiszewski et al. |
| 2018/0079515 | A1 | 3/2018 | Harwood et al. |
| 2018/0118356 | A1 | 5/2018 | Armstrong et al. |
| 2018/0127089 | A1 | 5/2018 | Welstead et al. |
| 2018/0170190 | A1 | 6/2018 | Siegel et al. |
| 2018/0178920 | A1 | 6/2018 | Swann et al. |
| 2018/0230845 | A1 | 8/2018 | Joshi et al. |
| 2018/0251226 | A1 | 9/2018 | Fenny et al. |
| 2018/0257787 | A1 | 9/2018 | Hamel et al. |
| 2020/0017228 | A1* | 1/2020 | Combs .................. B64D 31/02 |

OTHER PUBLICATIONS

Extended European Search Report dated Jan. 22, 2020 in connection with EP application No. 19195959.2, 6 pages.
Extended European Search Report dated Jan. 22, 2020 in connection with EP application No. 19196046.7, 6 pages.
Extended European Search Report dated Jan. 22, 2020 in connection with EP application No. 19196042.6, 6 pages.
Extended European Search Report dated Jan. 22, 2020 in connection with EP application No. 19195970.9, 6 pages.
Extended European Search Report dated Jan. 23, 2020 in connection with EP application No. 19196057.4, 6 pages.
Office Action dated Mar. 16, 2021 in counterpart EP application No. 19195955.0.
Pornet, Clement, "Electric Drives for Propulsion System of Transport Aircraft", New Applications of Electric Drives, Dec. 9, 2015, In Tech.

\* cited by examiner

HYBRID ELECTRIC PROPULSION SYSTEM AND METHOD OF OPERATION

CROSS-REFERENCE TO RELATED APPLICATIONS

The present application claims the benefit of U.S. Provisional Patent Application No. 62/727,673 filed on Sep. 6, 2018, U.S. Provisional Patent Application No. 62/727,678 filed on Sep. 6, 2018, U.S. Provisional Patent Application No. 62/727,681 filed on Sep. 6, 2018, U.S. Provisional Patent Application No. 62/727,683 filed on Sep. 6, 2018, U.S. Provisional Patent Application No. 62/729,818 filed on Sep. 11, 2018 and U.S. Provisional Patent Application No. 62/731,384 filed on Sep. 14, 2018, the contents of which are hereby incorporated by reference in their entirety.

TECHNICAL FIELD

The present disclosure relates generally to aircraft propulsion systems that use power from both an internal combustion engine and an electric motor.

BACKGROUND OF THE ART

Hybrid electric aircraft propulsion systems combine internal combustion and electric propulsion technologies. In an electric propulsion system, electrical energy is converted to rotational energy by an electric motor to drive a propulsion fan or a propeller.

There are environmental and cost benefits to having at least a portion of the power for an aircraft propulsion system come from electric motors. Therefore, there is a need for improvement to existing architectures.

SUMMARY

In accordance with a broad aspect, there is provided a hybrid electric aircraft propulsion system. The system comprises a thermal engine, a generator coupled to the thermal engine, a first electric propulsor operatively connected to the generator to receive alternating current (AC) electric power therefrom, a second electric propulsor, a generator inverter operatively connected to the generator to convert AC electric power to direct current (DC) electric power, and a first motor inverter operatively connected to the generator inverter and selectively connected to one of the first electric propulsor and the second electric propulsor and configured to receive the DC electric power and provide the first electric propulsor and the second electric propulsor with AC electric power, respectively.

In accordance with another broad aspect, there is provided a method for operating a hybrid electric aircraft propulsion system. The method comprises generating a first source of alternating current (AC) electric power from a generator and providing the AC electric power from the generator to a first electric propulsor, generating a second source of AC electric power from the generator, converting the second source of AC electric power into direct current (DC) electric power at a generator inverter, reconverting the DC electric power into the second source of AC electric power at a first motor inverter, and selectively providing the second source of AC electric power to a second electric propulsor and the first electric propulsor from the first motor inverter.

In accordance with yet another broad aspect, there is provided an aircraft comprising a hybrid electric aircraft propulsion system. The system comprises a thermal engine, a generator coupled to the thermal engine, a first electric propulsor operatively connected to the generator to receive alternating current (AC) electric power therefrom, a second electric propulsor, a generator inverter operatively connected to the generator to convert AC electric power to direct current (DC) electric power, and a first motor inverter operatively connected to the generator inverter and to the second electric propulsor and configured to receive the DC electric power and provide the second electric propulsor with AC electric power.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
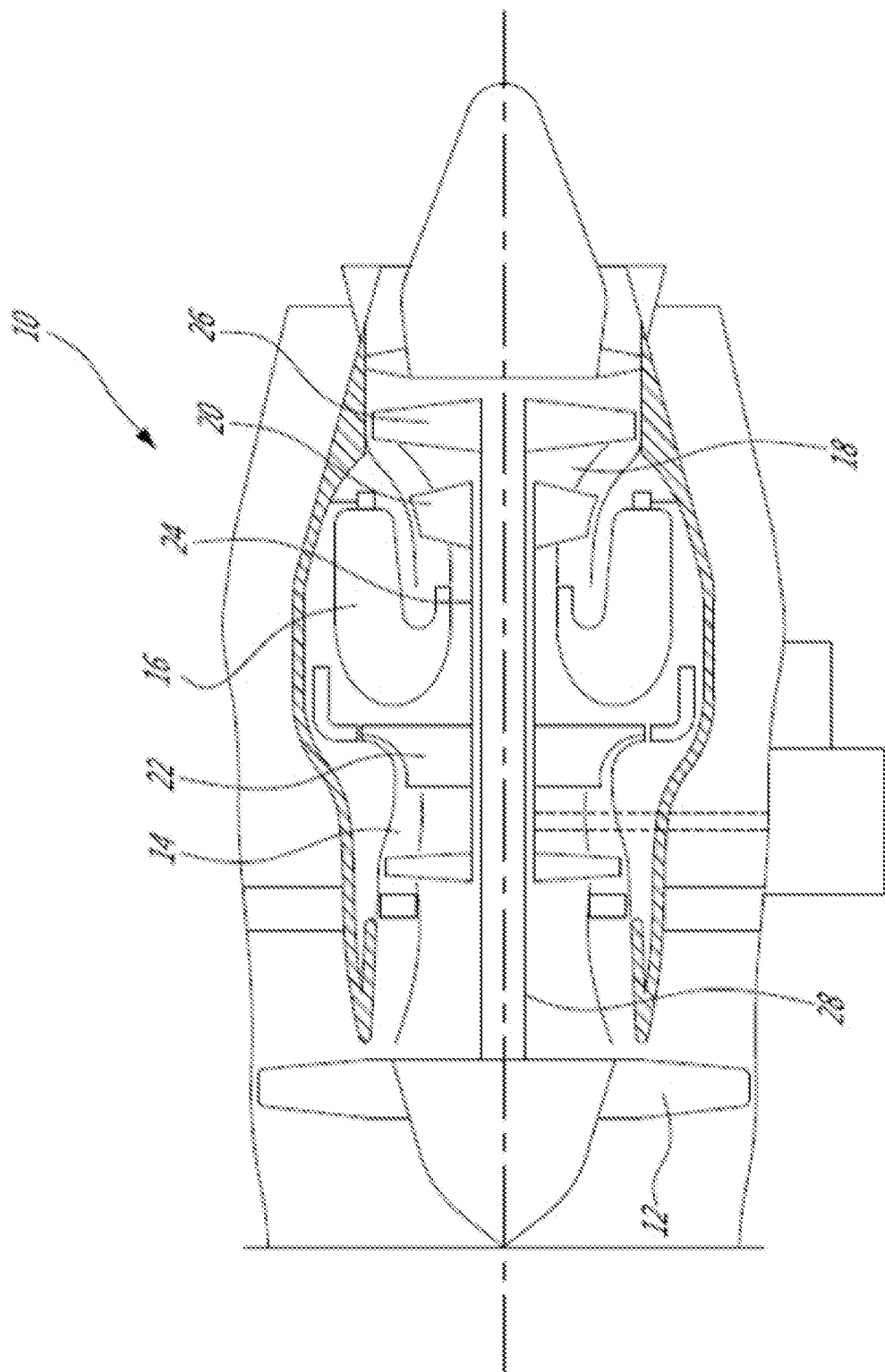
FIG. 1 is a schematic cross-sectional view of a gas turbine engine, in accordance with an illustrative embodiment.

There is described herein a hybrid electric aircraft propulsion system and method. The aircraft propulsion system uses power generated by a thermal engine and power generated by an electric generator. FIG. 1 illustrates an example thermal engine of a type preferably provided for use in subsonic flight, namely a gas turbine engine 10. The gas turbine engine 10 generally comprises in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section. A turboprop engine may also apply. In some embodiments, the thermal engine may be of a type other than a combustion engine, such as a piston engine or a rotary engine. In addition, although the engine 10 is described herein for flight applications, it should be understood that other uses, such as industrial or the like, may apply. Note that a constant volume combustion thermal machine, other than a piston or a rotary engine, may also be used.

Figure 2:
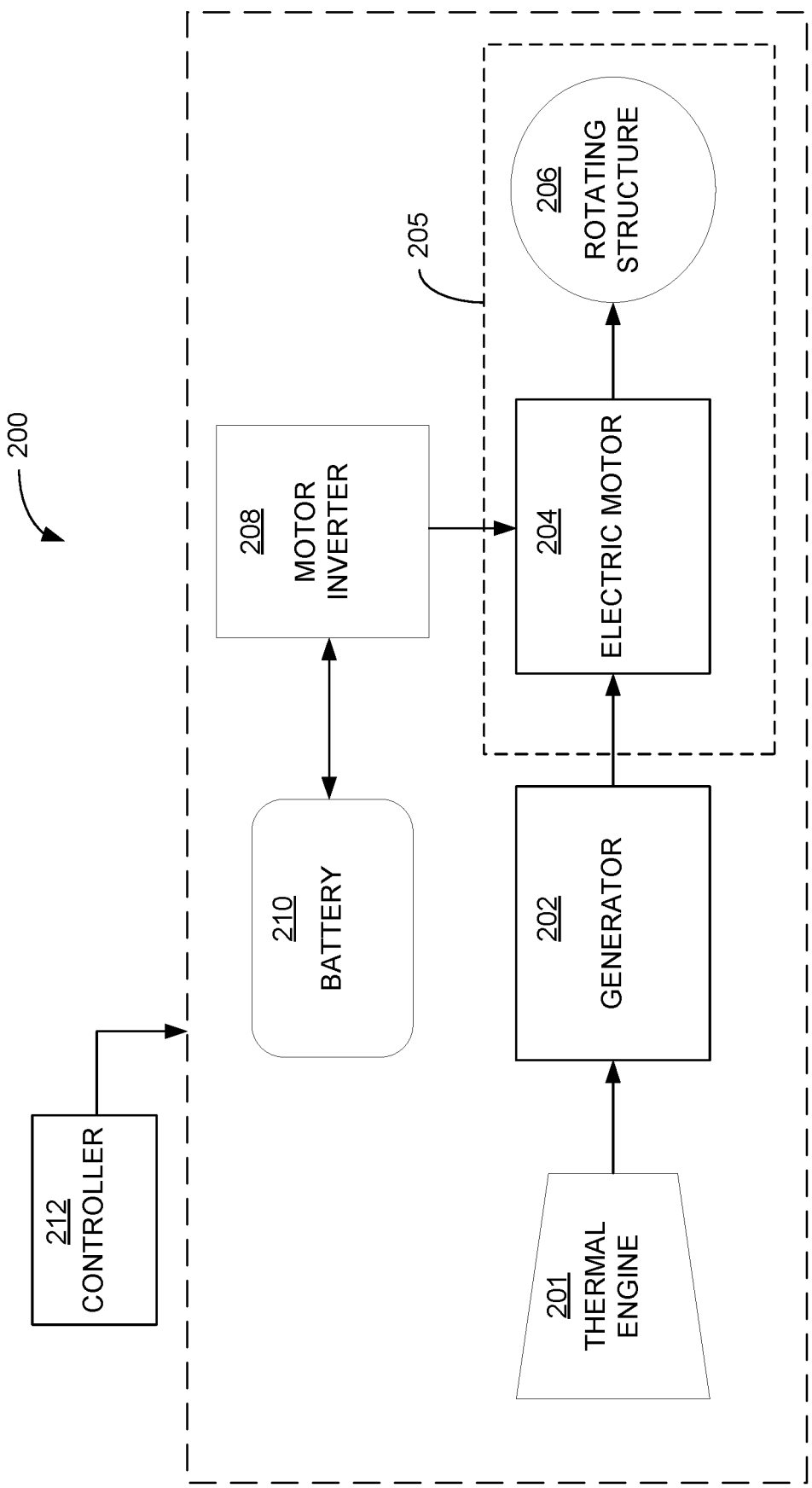
FIG. 2 is a block diagram of a hybrid electric aircraft propulsion system, in accordance with an illustrative embodiment.

Referring now to FIG. 2, there is illustrated an example embodiment for a hybrid electric aircraft propulsion system 200. The system 200 presents an AC-AC architecture, whereby alternating current (AC) electric power is generated and applied directly to an electric motor. In an AC-DC-AC architecture, the AC electric power is converted to direct current (DC) and then reconverted to AC electric power to drive the electric motor. The AC-AC architecture is more efficient than the AC-DC-AC architecture as there are losses incurred during the conversion stages from AC to DC and from DC to AC.

Thermal engine 201 is operatively coupled to a generator 202. The generator 202 receives motive power (or mechanical energy) from the thermal engine 201 and converts the motive power into electrical power. The generator 202 outputs alternating current (AC) electric power. The AC electric power is then provided directly to an electric motor 204. The electric motor 204 converts the AC electric power into mechanical energy in the form of a rotary force. The rotary force is applied to a rotating structure 206 (i.e. rotating propulsor), such as a propeller or a propulsion fan of an aircraft. The electric motor 204 and rotating structure 206 together form an electric propulsor.

The electric motor 204 also receives AC electric power from a motor inverter 208. The motor inverter 208 is operatively coupled to a battery 210 (or the aircraft electrical system). The battery 210 may be a dedicated battery provided for the hybrid electric aircraft propulsion system 200. Alternatively, the electric power supplied to the inverter 208 may come from: an auxiliary power unit, a supplementary power unit, a backup power generator system, or the aircraft electrical system that does not include batteries or capacitors. The motor inverter 208 may thus be connected to the battery 210 via a battery bus on the aircraft, or via dedicated wiring and/or connectors. Any type of device containing one or more cells that convert chemical energy directly into electrical energy may be used as the battery 210. In some embodiments, the battery 210 is based on a non-chemical principal, such as using the electricity of a supercapacitor in an energy storage mode.

The motor inverter 208 receives direct current (DC) electric power from the battery 210 (or another direct current source) and converts the DC voltage to AC voltage whose frequency and phase is adjusted to enable the motor 204 to generate mechanical power. The motor inverter 208 can also be used in the opposite sense to charge the battery 210 when the electric motor 204 is being driven by external machine forces, making it behave as a generator, in which condition the inverter can convert AC voltage back into DC voltage. In some embodiments, the motor inverter 208 may also be used in a reverse mode, whereby AC electric power is converted to DC electric power.

The electric motor 204 therefore has a first input operatively coupled to the generator 202 to receive a first source of AC electric power. The electric motor 204 also has a second input operatively coupled to the motor inverter 208 to receive a second source of AC electric power. Note that the electric motor 204 does not need to have two independent inputs (i.e. one from the generator 202 and one from the inverter 208). The output of the generator 202 and the output of the inverter 208 may be combined or connected in parallel before a motor input interface. The electric motor 204 will, in response to receiving either one of the first source of AC electric power and the second source of AC electric power (or both simultaneously), generate a rotating output for driving the rotating structure 206.

A controller 212 is configured for selectively driving the electric motor 204 using the first source of AC electric power from the generator 202, the second source of AC electric power from the motor inverter 208, or a combination thereof. When AC electric power is received concurrently from both the generator 202 and the motor inverter 208, a greater amount of power is available to the electric motor 204. This in turn allows for a greater rotary force to be applied to the rotating structure 206.

In some embodiments, the first source of AC electric power provided by the generator 202 is the primary source of propulsion power for the electric motor 204. For example, under low power operating conditions, such as in cruise mode, all propulsive power for the rotating structure 206 may be provided by the generator 202. Under high power operating conditions, such as in climb mode or take-off mode, a boost of propulsion power may be provided by the battery 210 through the motor inverter 208. A secondary or additional source of electric power is thus available for the electric motor 204 through the motor inverter 208 in order to supplement the electric power provided by the generator 202.

In some embodiments, the motor inverter 208 is sized to match the secondary power requirements of the electric motor 204, i.e. the motor inverter 208 does not need to be a full-size motor inverter in order to drive the electric motor 204 on its own. In addition, there is no need for a generator converter to convert the voltage from AC to DC, since the electric power generated by the generator 202 is fed to the electric motor 204 without conversion. This architecture thus avoids the need for two stages of conversion during low power operating conditions. In some embodiments, the battery 210 is recharged directly from the motor inverter 208.

In some embodiments, the motor inverter 208 is used to recover from or prevent desynchronization of the generator 202 and the electric motor 204. When used for recovery of desynchronization, the motor inverter 208 may resynchronize the frequency of the electric motor 204 to the frequency of the generator 202, in response to a command or control signal received from the controller 212, or in response to logic implemented in the inverter 208 which monitors and seeks to control the frequency and phasing of the generator 202 and motor 204. During resynchronization, the controller 212 may temporarily disconnect the generator 202 from the electric motor 204, for example by opening a relay therebetween. The motor inverter 208 may then adjust the power to the electric motor 204 so that the speed of the electric motor 204 is modified in such a way to match the frequency of the electric motor 204 to the frequency of the generator 202. The electric motor 204 and the generator 202 can then be brought back in phase with each other. Once the electric motor 204 is back in phase with the generator 202, the connection between the generator 202 and the electric motor 204 is restored.

When used for prevention of desynchronization, the motor inverter 208 may actively monitor the phase of the electric motor 204. Upon detection of a mismatch in phase between the generator 202 and the electric motor 204, for example in the case where the motor is slowed down by external forces, the motor inverter 208 may send an electric signal that is in-phase with the electric motor 204, to provide additional power to bring the electric motor 204 back in phase with the generator 202. This feature may be put into effect by the controller 212 or it can be incorporated in the inverter 208.

In some embodiments, the motor inverter 208 is used to recharge the battery 210 or provide additional electrical power to the aircraft electrical systems that are connected to the inverter 208. For example, the motor inverter 208 can increase the power demand on the generator 202, such that the power produced by the generator exceeds the power required by the rotating structure 206 or load, and feed the excess power back to the battery 210 or aircraft electrical system. Alternatively, the motor inverter 208 can increase the power going to the electric motor 204 by feeding energy from the battery 210 to the electric motor 204. This in turn increases the power available to the rotating structure 206. The motor inverter 208 can either increase the available torque to the rotating structure 206 (ex: for a variable pitch propeller, additional torque may be required depending on the selected pitch of the propeller), or it can act as a generator to extract energy from a windmilling propeller by converting the AC voltage to a DC voltage that is higher than DC bus voltage in order to recharge the battery or feed electrical power back to the aircraft electrical system, if so desired. The inverter 208 has the ability to control the voltage on the DC bus, thereby controlling the power going to the DC bus.

Figure 3:
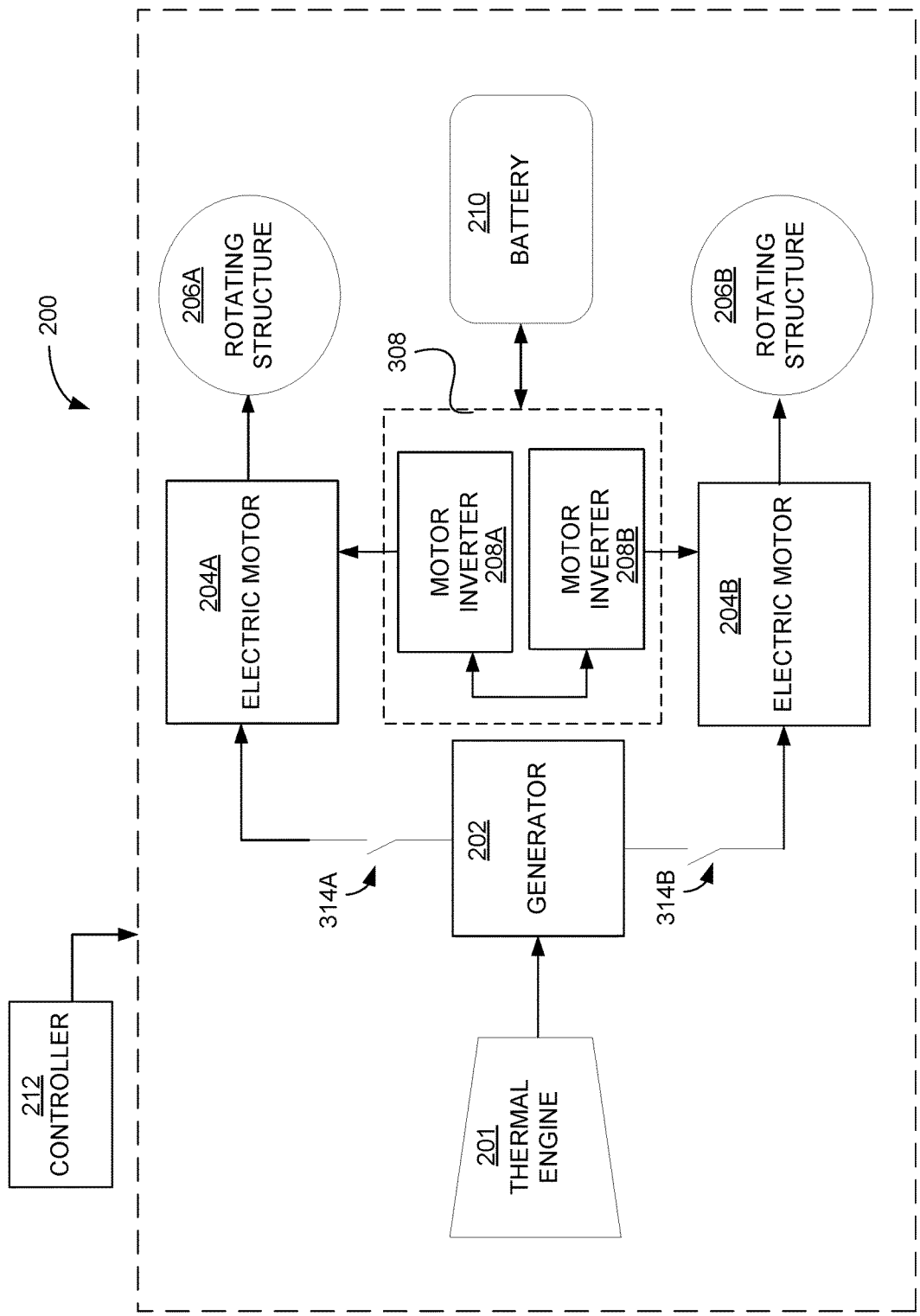
FIG. 3 is a block diagram of a hybrid electric aircraft propulsion system having two electric motors, in accordance with an illustrative embodiment.

Referring to FIG. 3, there is illustrated another example embodiment for a hybrid electric aircraft propulsion system 200. In this example, two electric motors 204a, 204b are driven by the generator 202. Each electric motor 204a, 204b, is associated with its own rotating structure 206a, 206b, respectively. Two motor inverters 208a, 208b are also provided, one to feed each one of the electric motors 204a, 204b, respectively. It should be understood that a single motor inverter 308 may also be used instead of two separate motor inverters 208a, 208b. The motor inverter 308 would then be sized for the power requirements of two electric motors 204a, 204b instead of just one of the electric motors 204a, 204b. In addition, the motor inverter 308 would need to be disconnected from electric motor 204a in order to perform a resynchronization of electric motor 204b, and disconnected from electric motor 204b in order to perform a resynchronization of electric motor 204a.

In some embodiments, the two motor inverters 208a, 208b are interconnected, in case of a failure of one of the two motor inverters 208a, 208b. For example, if one motor inverter 208a fails, the other motor inverter 208b may be used to charge the battery 210 or to drive the electric motor 204a associated with the failed motor inverter 208a. This may also be achieved using a series of connections between the electric motors 204a, 204b and the motor inverters 208a, 208b to allow for selective connection and disconnection of the electric motors 204a, 204b to the motor inverters 208a, 208b.

In some embodiments, one or more relays 314a, 314b are provided in the interconnection path between the generator 202 and each one of the electric motors 204a, 204b, respectively. The relays 314a, 314b are an example embodiment for allowing selective connection and disconnection of the generator 202 to either one of the electric motors 204a, 204b. Other means of connection/disconnection may also be used.

The electric motors 204a, 204b may be provided on separate wings of an aircraft. Alternatively, they may be provided on a same wing of an aircraft. Also alternatively, one or both of the electric motors 204a, 204b may be provided in the nacelle or hub of a rotating propulsion device such as a propeller, fan, lift rotor or thruster, or in the hub of a contra-rotating propeller, fan rotor or thruster.

Three or more electric motors may be provided, whereby each electric motor 204 is associated with a motor inverter 208. Alternatively, two or more motor inverters 208 may be combined to form a larger motor inverter 308 for all of the electric motors 204 or a subset thereof.

Figure 4:
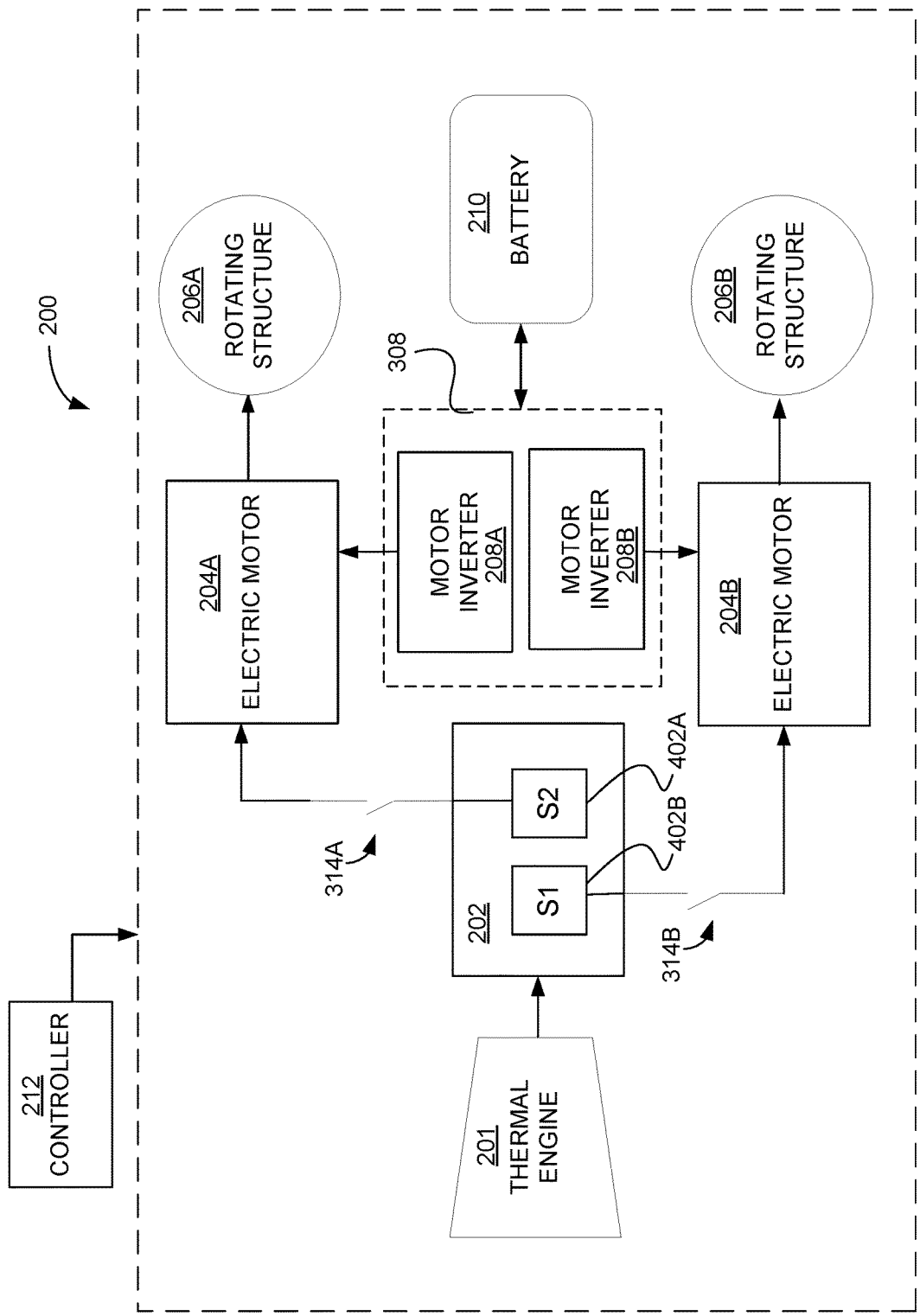
FIG. 4 is a block diagram of a block diagram of a hybrid electric aircraft propulsion system having a dual stator generator, in accordance with an illustrative embodiment.

FIG. 4 illustrates yet another embodiment of the hybrid electric aircraft propulsion system 200. In this example, the generator 202 is a dual stator generator, having a first generator stator 402a driving one electric motor 204a and a second generator stator 402b driving the other electric motor 204b. Note that this embodiment could also be applied to three or more sets of generator stators, motors and inverters. Two or more of the inverters 208 may be combined to form a larger motor inverter 308 for all the electric motors 204 or a subset thereof. In some embodiments, motor inverters 208a, 208b comprise a converter to perform the conversion from AC to DC to recharge the battery 210. The electric motors 204a, 204b are driven independently from each other. Relays 314a, 314b may or may not be present in this embodiment, so as to allow a selective connection/disconnection of the generator 202 and the electric motors 204a, 204b.

Figure 5:
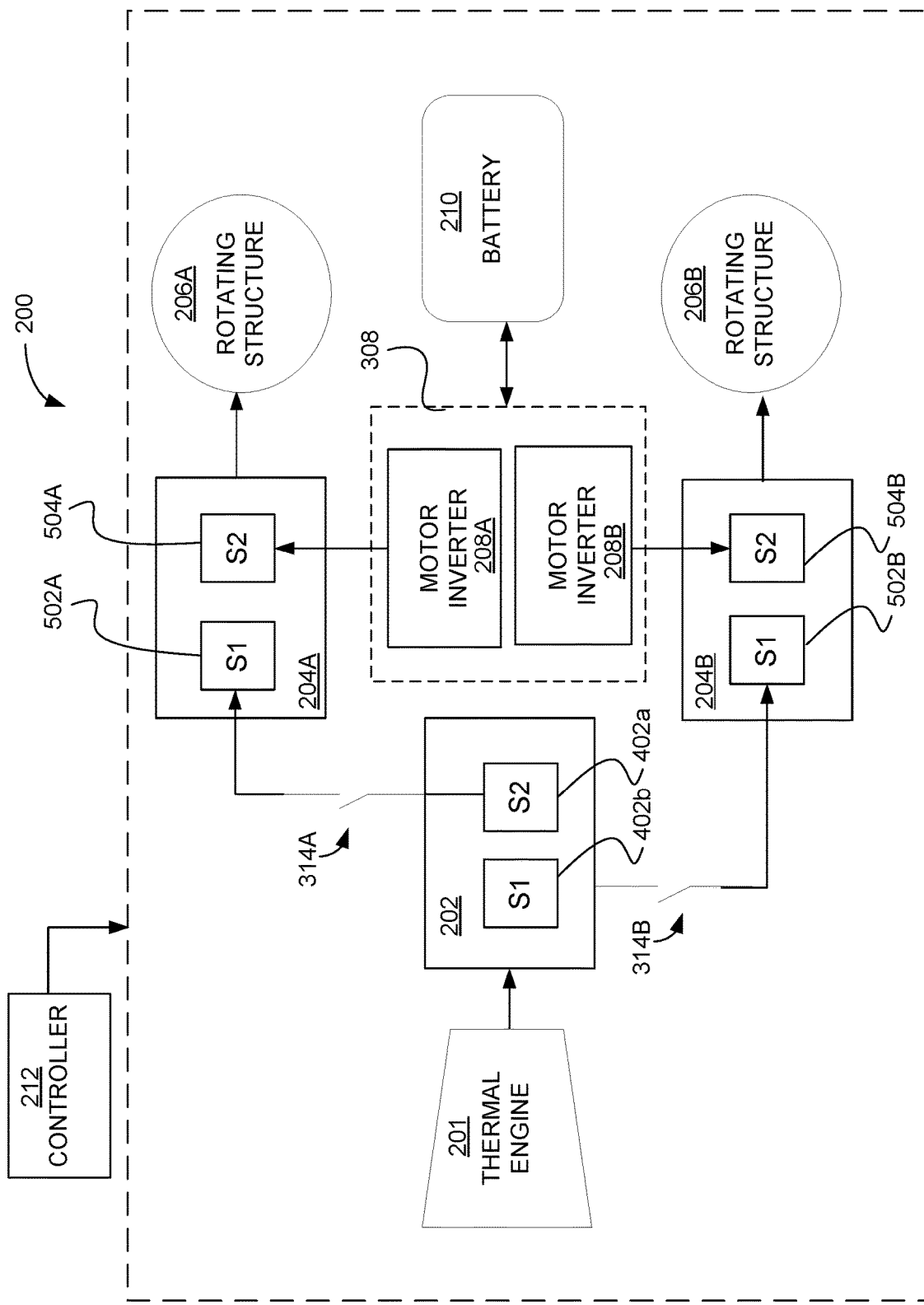
FIG. 5 is a block diagram of a hybrid electric aircraft propulsion system having dual stator electric motors, in accordance with an illustrative embodiment.

FIG. 5 illustrates another example embodiment of the hybrid electric aircraft propulsion system 200. In this example, one or more of the electric motors 204a, 204b have dual stators. The example illustrated shows electric motor 204a having a first motor stator 502a and a second motor stator 504a, and electric motor 204b having a first motor stator 502b, and a second motor stator 504b. Motor stator 502a is operatively coupled to generator stator 402a, and motor stator 502b is operatively coupled to generator stator 402b. Motor stator 504a is operatively coupled to motor inverter 208a, and motor stator 504b is operatively coupled to motor inverter 208b. In this configuration, the generator 202 does not share the same motor stator as the motor inverters 208a, 208b, thus resulting in the generator power and the motor inverter power being independent from one another. Should the motor inverter 208a be used to recharge the battery 210, stator 504b would act as a motor while stator 504a would act as a generator from which a conversion from AC to DC is required to recharge the battery 210. Should the motor inverter 208b be used to recharge the battery 210, stator 504a would act as a motor while stator 504b would act as a generator from which a conversion from AC to DC is required to recharge the battery 210.

Figure 6:
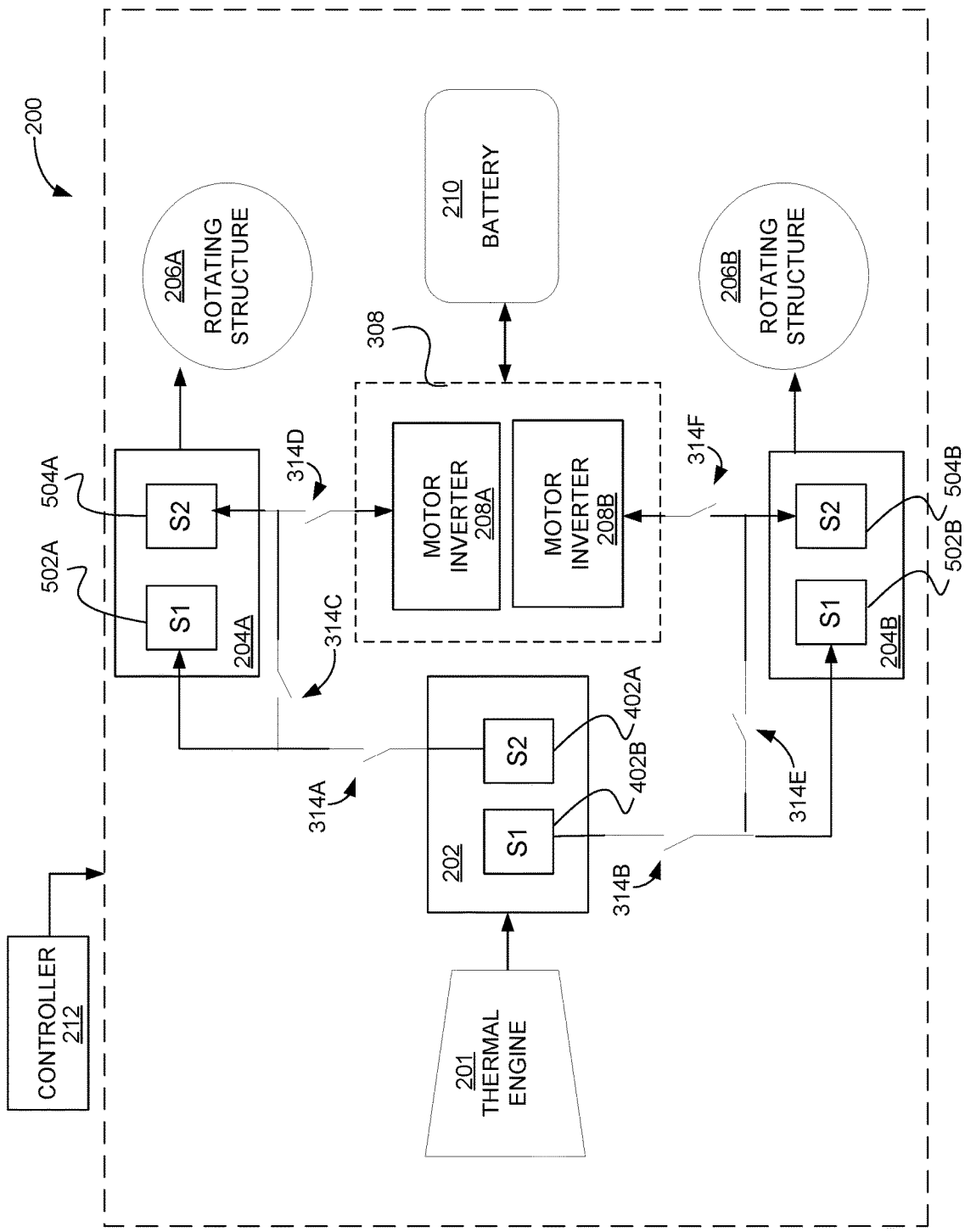
FIG. 6 is a block diagram of a hybrid electric aircraft propulsion system having selective connectivity, in accordance with an illustrative embodiment.

Referring to FIG. 6, there is illustrated another embodiment of the hybrid electric aircraft propulsion system 200. In this example, additional connections are provided between the generator 202, the electric motors 204a, 204b, and the motor inverters 208a, 208b. Generator stator 402a may be selectively connected to both stators 502a, 504a of the electric motor 204a by closing relays 314a and 314c and opening relay 314d. Generator stator 402b may be selectively connected to both stators 502b, 504b of the electric motor 204b by closing relays 314b and 314e and opening relay 314f. Motor inverter 208a may be selectively connected to both stators 502a, 502b of the electric motor 204a by closing relays 314d and 314c and opening relay 314a. Motor inverter 208b may be selectively connected to both stators 502b, 504b of the electric motor 204b by closing relays 314f and 314e and opening relay 314b. Also, each stator 502a and/or 502b can be connected to both the generator stator 402a and the inverter 208A simultaneously, without opening relay 314a if so desired. This is useful to be able to use the inverters to either provide additional power or extract power to recharge batteries, or provide power to the aircraft DC bus, or to adjust and to maintain the motor and generator in phase with each other. Likewise for the other motor and associated generator stator, inverters, relays etc. This architecture provides the ability for the generator 202 to drive both stators 502a, 504a or 502b, 504b of either electric motor 204a, 204b, and for the motor inverters 208a, 208b, to drive both stators 502a, 504a or 502b, 504b of either electric motor 204a, 204b.

The architecture of FIG. 6 also provides the ability to recharge the battery 210 directly from the generator 202 by closing relays 314a, 314c, 314d and/or 314b, 314e, 314f, thereby providing a direct path between the generator 202 and the motor inverters 208a, 208b, respectively. In such a case, one or both of motor inverters 208a, 208b would need to be provided with an AC-DC converter to transform the AC power received by the generator 202 into DC power for the battery 210. The architecture of FIG. 6 also provides the ability for the battery to be used to provide mechanical power to the thermal engine, by driving the stator 402a or 402b as an electric motor instead of as a generator, if so desired, for example if this is useful to start the thermal engine or drive auxiliary systems such as pumps that are connected to the generator shaft before the engine is started. The same could be said of other embodiments.

Figure 7:
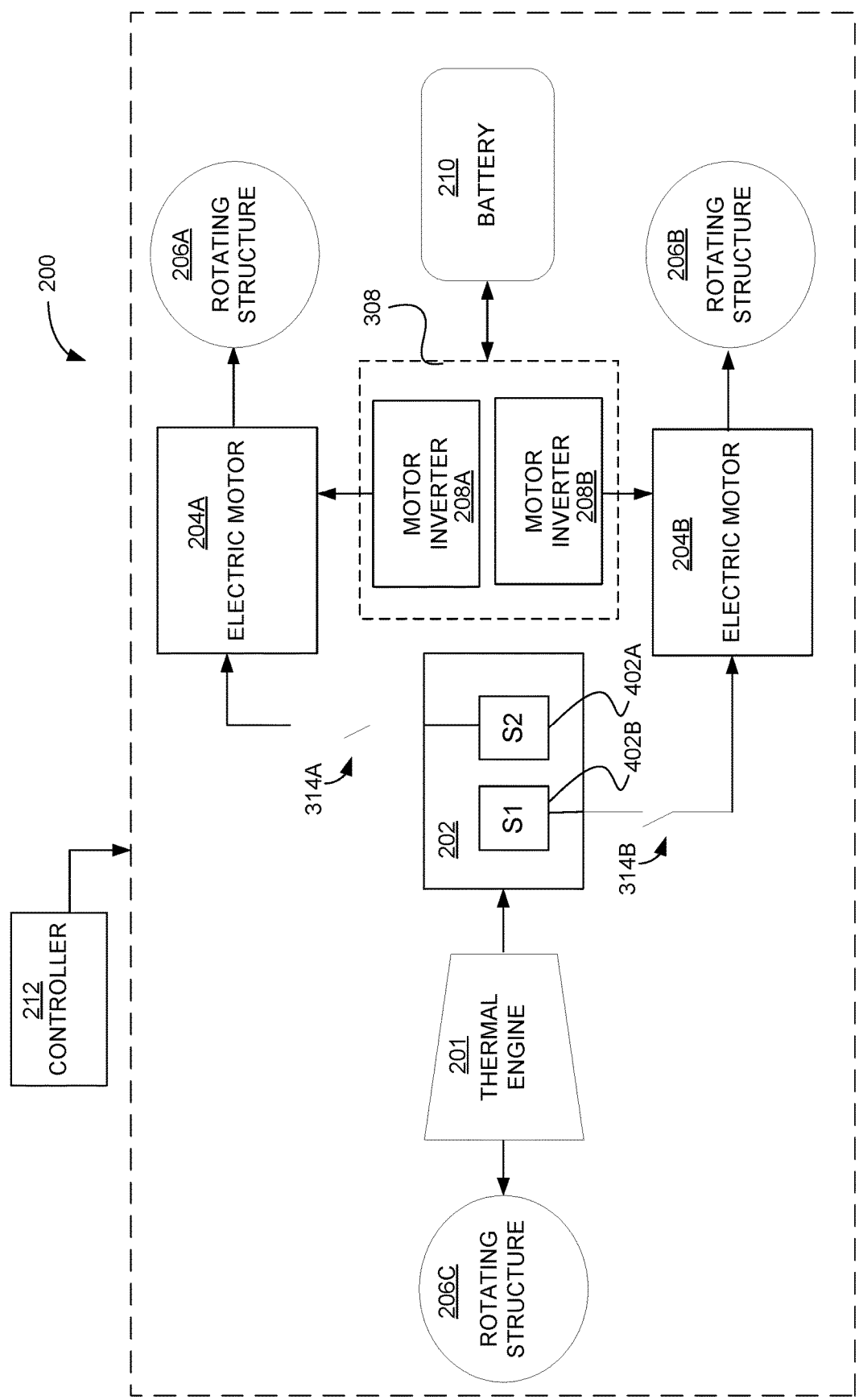
FIG. 7 is a block diagram of a hybrid electric aircraft propulsion system having additional propulsive power, in accordance with an illustrative embodiment.

Turning to FIG. 7, there is illustrated yet another embodiment of the hybrid electric aircraft propulsion system 200. In this example, a rotating structure 206c is operatively coupled to the thermal engine 201 so as to provide additional propulsion to the aircraft. Indeed, the motive power generated by the thermal engine 201 may also be applied directly to a rotating structure 206c such as a propeller or propulsion fan of the aircraft in order to supplement propulsion provided by rotating structures 206a, 206b.

It should be noted that while rotating structure 206c is illustrated in combination with the embodiment of FIG. 4, it may also be added to any of the other embodiments provided in FIGS. 2, 3, 5 and 6, as well as variants thereof. Variants thereof include, for example, a three-stator generator connected to three electric motors. It will be understood that the present embodiments apply to any number of generator stators and motor stators. Another example of a variant to the present embodiments is a three stator electric motor, each stator connected to one of a generator stator, a first motor inverter, and a second motor inverter. The first and second motor inverters can be connected to a same battery or to separate batteries. Other variants will be readily understood by those skilled in the art.

Figure 8:
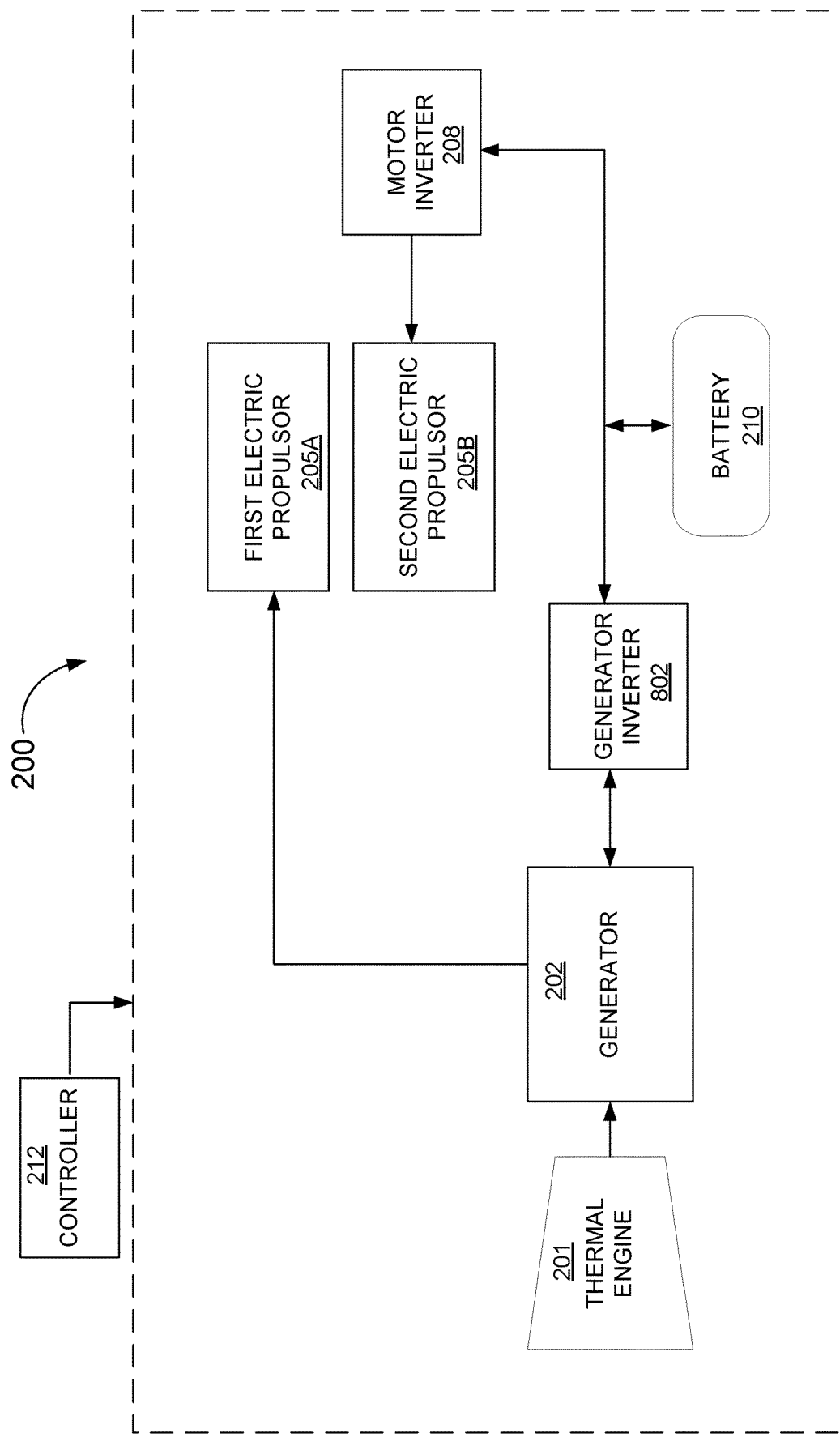
FIG. 8 is a block diagram of a hybrid electric aircraft propulsion system having an AC-AC configuration and an AC-DC-AC configuration for two electric propulsors, in accordance with an illustrative embodiment.

FIG. 8 illustrates another embodiment of the hybrid electric aircraft propulsion system 200. The generator 202 is powered by the thermal engine 201 and connected to a first electric propulsor 205a. The AC electric power generated by the generator 202 is provided directly to the first electric propulsor 205a without any conversion, referred to herein as an AC-AC subsystem or an AC-AC configuration. The generator 202 is also connected to a generator inverter 802 which is connected to a DC/AC motor inverter 208. The generator inverter 802 converts the AC electric power generated by the generator 202 into DC electric power. The DC electric power is then provided to the motor inverter 208 for conversion back into AC electric power. The motor inverter 208 is connected to a second electric propulsor 205b. The reconverted AC electric power is transmitted to the second electric propulsor 205b.

In some embodiments, a battery 210 (or any other source of DC power) is operatively connected to the generator inverter 802 and the motor inverter 208. The AC electric power generated by the generator 202 is provided to the second electric propulsor 205b through the generator inverter 802 and the motor inverter 208, referred to herein as an AC-DC-AC subsystem or an AC-DC-AC configuration. In some embodiments, the generator inverter 802 is also configured to convert DC electric power into AC electric power. In some embodiments, the motor inverter 208 is also configured to convert AC electric power into DC electric power. All of the motor inverters and generator inverters described herein may be unidirectional or bidirectional, depending on the application.

The AC-AC subsystem has an increased efficiency and reduced weight, while the AC-DC-AC subsystem provides thrust balancing capabilities. More specifically, there is more flexibility on the operating speed of the electric propulsor in an AC-DC-AC configuration since the electric motor does not need to be synchronized with the generator. Therefore, variable speed can be used to modulate thrust. In some embodiments, a boost of propulsion power is available via the battery 210, through the motor inverter 208, to the second electric propulsor 205b.

Figure 9:
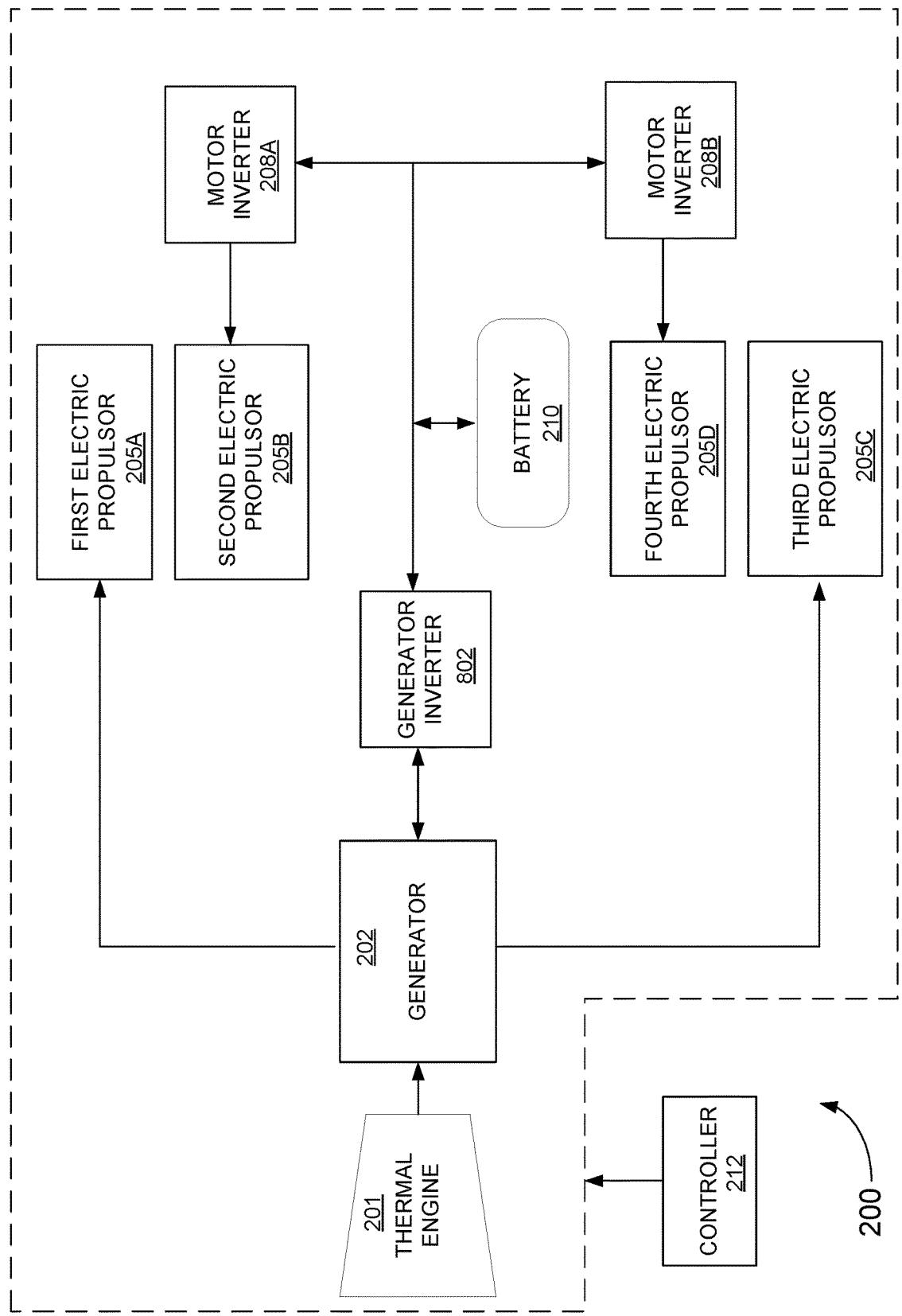
FIG. 9 is a block diagram of a hybrid electric aircraft propulsion system having an AC-AC configuration and an AC-DC-AC configuration for four electric propulsors, in accordance with a first illustrative embodiment.

FIG. 9 illustrates the hybrid electric aircraft propulsion system 200 with the generator 202 driving two electric propulsors 205a, 205c in AC-AC configurations and two electric propulsors 205b 205d in AC-DC-AC configurations. A first electric propulsor 205a and a third electric propulsor 205c are both directly connected to the generator 202 in the AC-AC configuration. A second electric propulsor 205b is connected to the generator 202 in an AC-DC-AC configuration via a generator inverter 802 and a first motor inverter 208*a*. A fourth electric propulsor 205*d* is connected to the generator 202 in an AC-DC-AC configuration via the generator inverter 802 and a second motor inverter 208*b*. Note that a single motor inverter may be used instead of two dedicated motor inverters 208*a*, 208*b*. Also note that two dedicated generator inverters may be used instead of a shared generator inverter 802.

Figure 10:
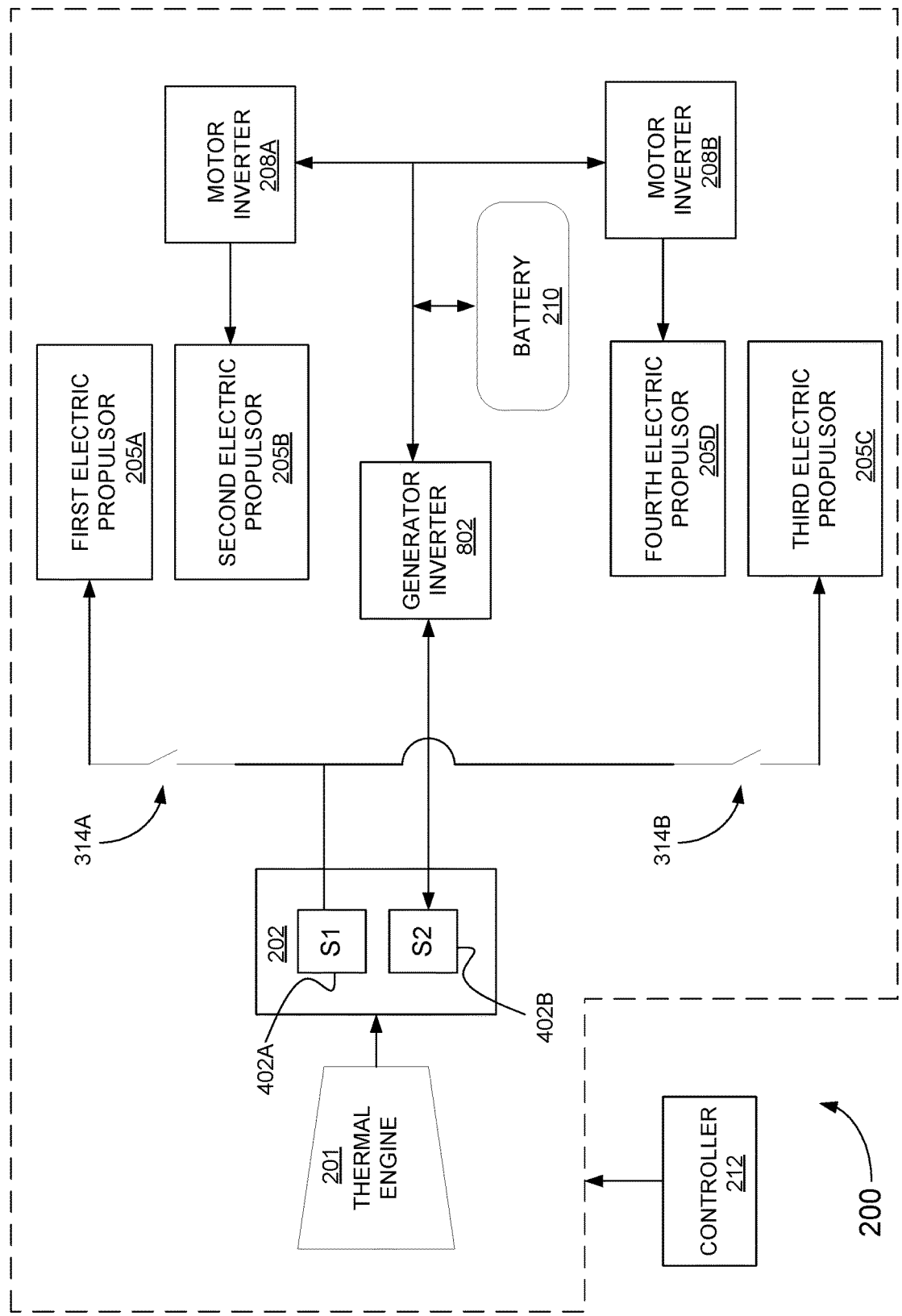
FIG. 10 is a block diagram of a hybrid electric aircraft propulsion system having an AC-AC configuration and an AC-DC-AC configuration for four electric propulsors, in accordance with a second illustrative embodiment.

In some embodiments, the generator 202 is a dual stator generator, as illustrated in FIG. 10. A first generator stator 402*a* drives the AC-AC subsystem and a second generator stator 402*b* drives the AC-DC-AC subsystem. The subsystems are thus driven independently from one another. In some embodiments, relays 314*a*, 314*b* (or another connection/disconnection mechanism) are provided to allow the first generator stator 402*a* to be selectively connected to the first electric propulsor 205*a* or the third electric propulsor 205*c*. The connection/disconnection may be controlled by the controller 212.

Figure 11:
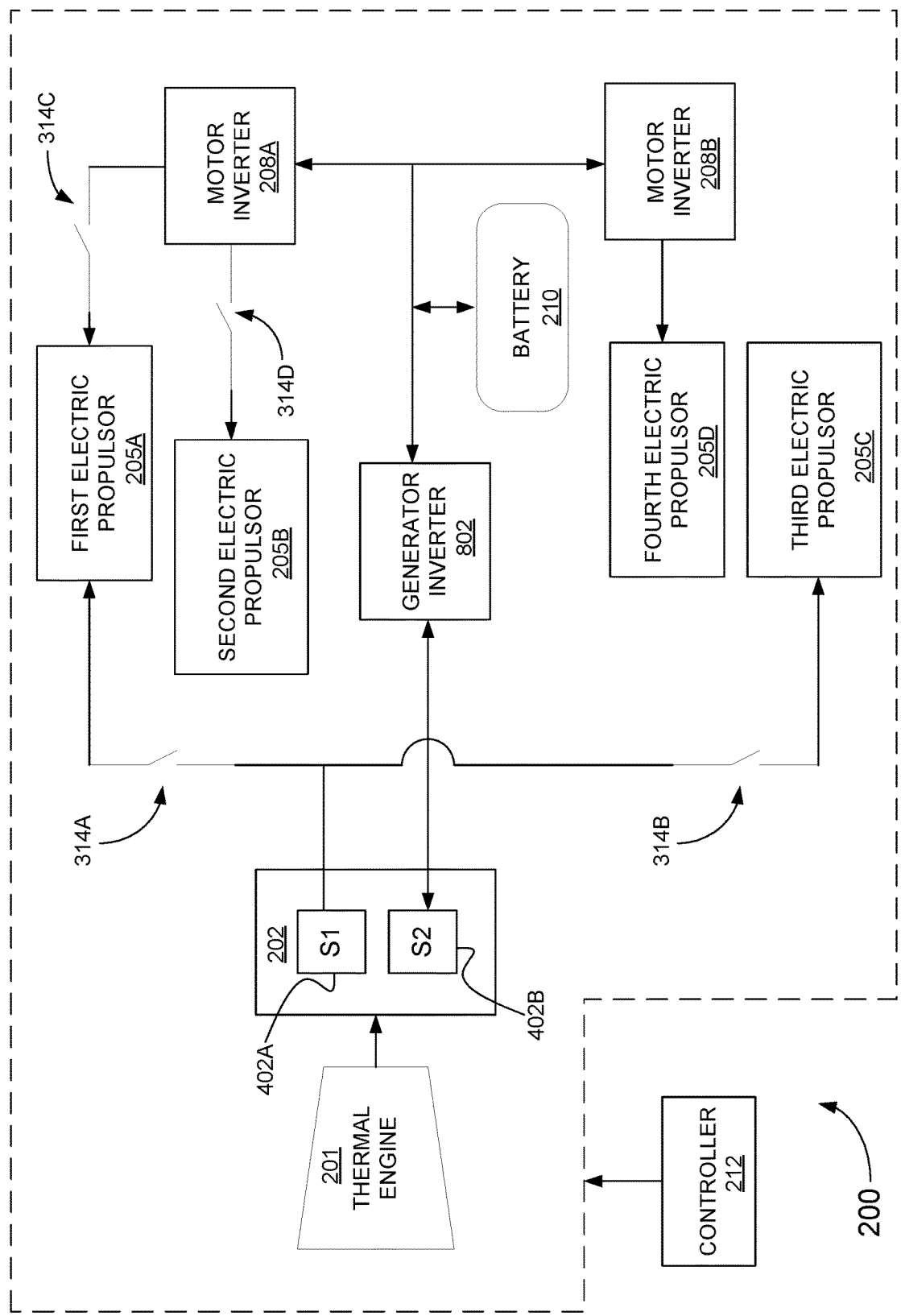
FIG. 11 is a block diagram of a hybrid electric aircraft propulsion system having an AC-AC configuration and an AC-DC-AC configuration for four electric propulsors, in accordance with a third illustrative embodiment.

In some embodiments, relays 314*c*, 314*d* are used to selectively connect the motor inverter 208*a* to the first electric propulsor 205*a* or the second electric propulsor 205*b*, as shown in FIG. 11. The boost of propulsion power available via the battery 210 may then be provided to either one of the first electric propulsor 205*a* and the second electric propulsor 205*b*. In addition, the motor inverter 208*a* may be used to resynchronize the frequency of the first electric propulsor 205*a* with the frequency of the generator 202, as described herein. Although not illustrated, the same connection/disconnection mechanisms can also be used to selectively connect the motor inverter 208*b* to either one of the third electric propulsor 205*c* and the fourth electric propulsor 205*d*. Propulsion boost is thus also available to both the third electric propulsor 205*c* and the fourth electric propulsor 205*d*. Resynchronization capabilities are available to the third electric propulsor 205*c*. These features may be controlled by the controlled 212. It will be understood that the selective connection of the motor inverter 208*a* to the first electric propulsor 205*a* or the second electric propulsor 205*b* may also be applied to the other embodiments described herein, such as those illustrated in FIGS. 8, 9, 10, 12, and 13. This feature may be combined with any of the other features described herein.

Figure 12:
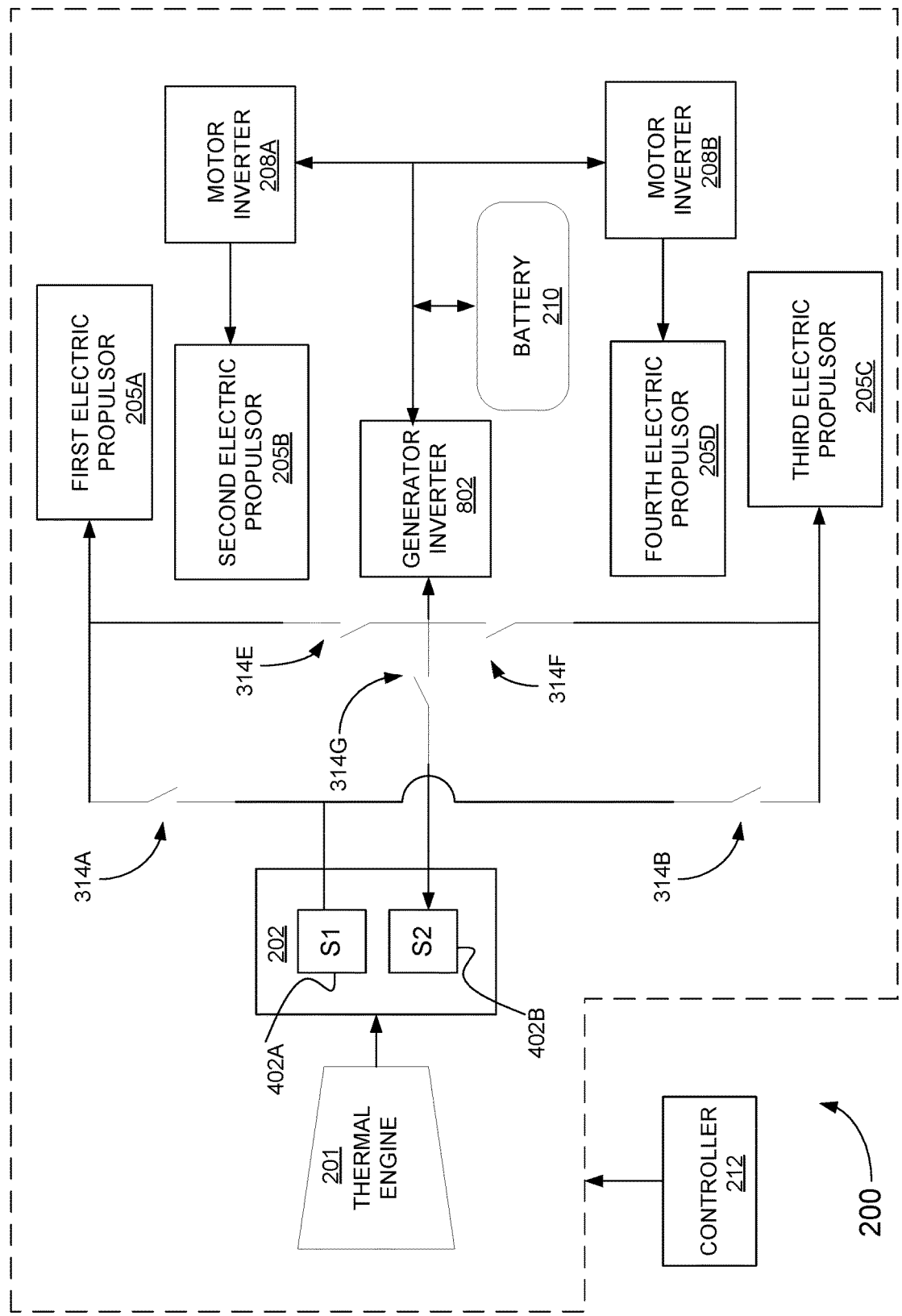
FIG. 12 is a block diagram of a hybrid electric aircraft propulsion system having an AC-AC configuration and an AC-DC-AC configuration for four electric propulsors, in accordance with a fourth illustrative embodiment.

In some embodiments, relays 314*e*, 314*f* are used to selectively connect the generator inverter 802 to either one of the first electric propulsor 205*a* and the third electric propulsor 205*c*, as shown in FIG. 12. In this example, relay 314*g* is used to disconnect the generator inverter 802 from the generator 202, in order to connect the generator inverter 802 to the first electric propulsor 205*a* or the third electric propulsor 205*c*. The generator inverter 802 is also connected to the battery 210 and may thus be used to provide an additional propulsion boost to the first electric propulsor 205*a* and/or the third electric propulsor 205*c* or to resynchronize the frequency of the first electric propulsor 205*a* or the third electric propulsor 205*c* with the frequency of the generator 202, as described herein. These features may be controlled by the controlled 212. It should be understood that although not illustrated, the embodiments of FIGS. 11 and 12 may be provided together in a single embodiment.

Figure 13:
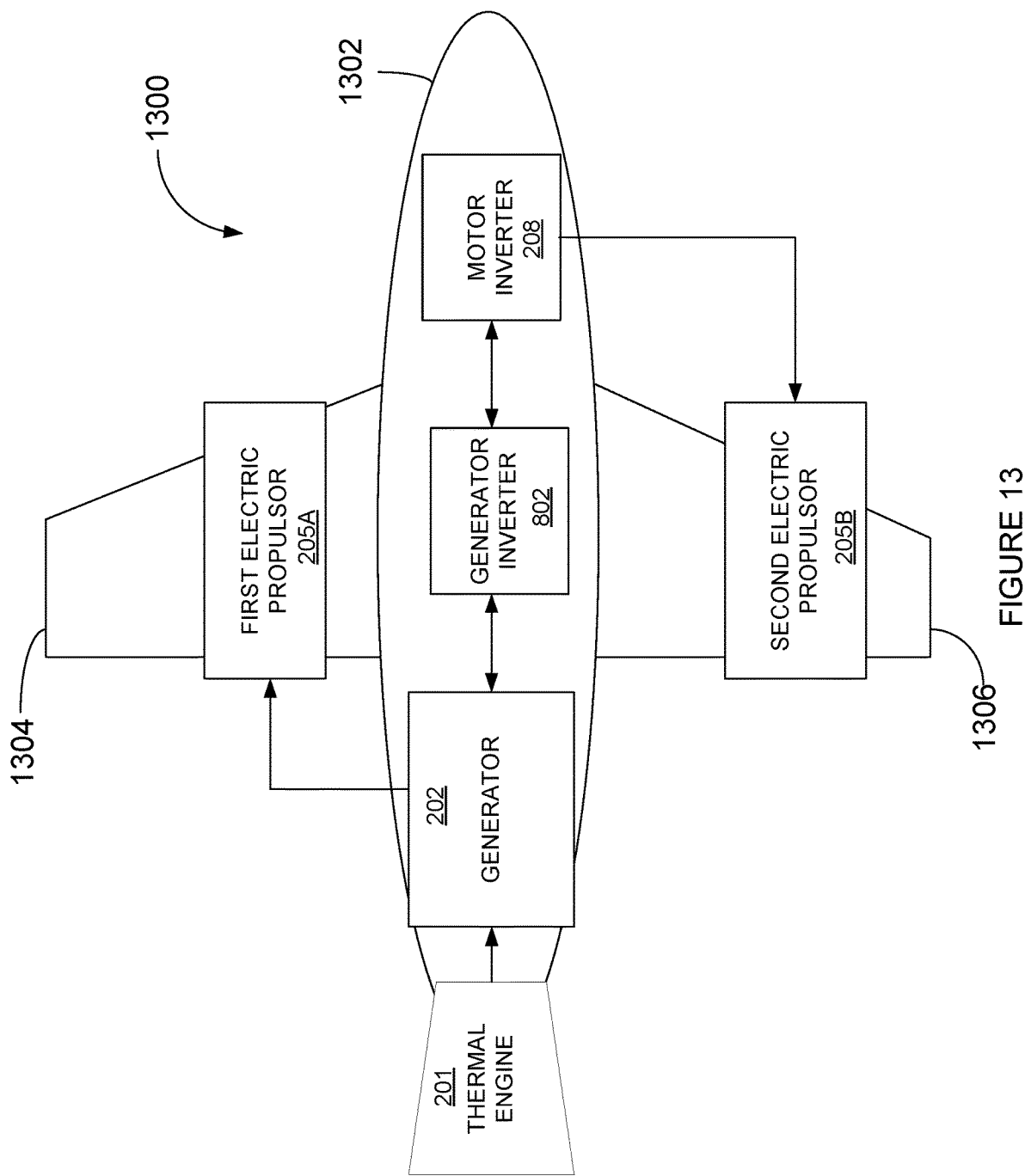
FIG. 13 is a top view of an aircraft having a hybrid electric aircraft propulsion system mounted thereto, in accordance with a first illustrative embodiment.

FIG. 13 is an example embodiment of the hybrid electric aircraft propulsion system mounted to an aircraft 1300. The aircraft 1300 has a fuselage 1302, a first wing 1304 and a second wing 1306. The generator 202 is connected to the first electric propulsor 205*a* in an AC-AC configuration. The generator 202 is connected to the second electric propulsor 205*b* in an AC-DC-AC configuration. The first electric propulsor 205*a* is mounted to the first wing 1304 of the aircraft 1300 and the second electric propulsor 205*b* is mounted to the second wing 1306. The thermal engine 201 and the generator 202 are mounted to the fuselage 1302. The generator inverter 802 and the motor inverter 208 may be mounted to the wings 1304, 1306 or to the fuselage 1302.

Figure 14:
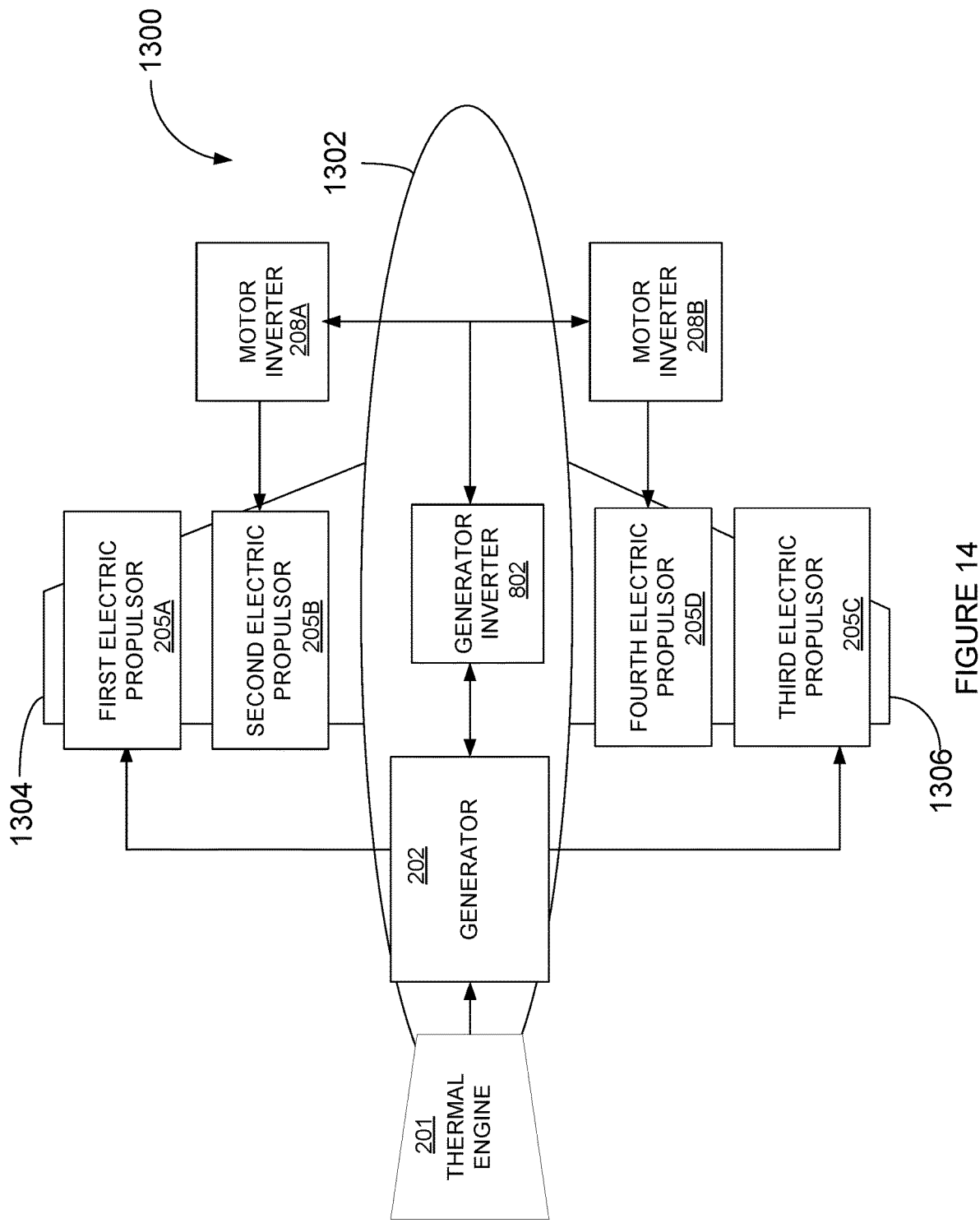
FIG. 14 is a top view of an aircraft having a hybrid electric aircraft propulsion system mounted thereto, in accordance with a second illustrative embodiment.

FIG. 14 is an alternative embodiment of the aircraft 1300 with the hybrid electric aircraft propulsion system mounted thereto. The generator 202 is connected to the first electric propulsor 205*a* and the third electric propulsor 205*c* in an AC-AC configuration. The first electric propulsor 205*a* is mounted to the first wing 1304 and the third electric propulsor 205*c* is mounted to the second wing 1306. The generator 202 is connected to the second electric propulsor 205*b* and to the fourth electric propulsor 205*d* in an AC-DC-AC configuration. The second electric propulsor 205*b* is mounted to the first wing 1304 and the fourth electric propulsor 205*d* is mounted to the second wing 1306. Each wing 1304, 1306 thus has one AC-AC subsystem and one AC-DC-AC subsystem. The generator inverter 802 and the motor inverters 208*a*, 208*b* may be mounted to the wings 1304, 1306 or to the fuselage 1302. In some embodiments, three or more AC-AC subsystems are provided. In some embodiments, 3 or more AC-DC-AC subsystems are provided.

Figure 15:
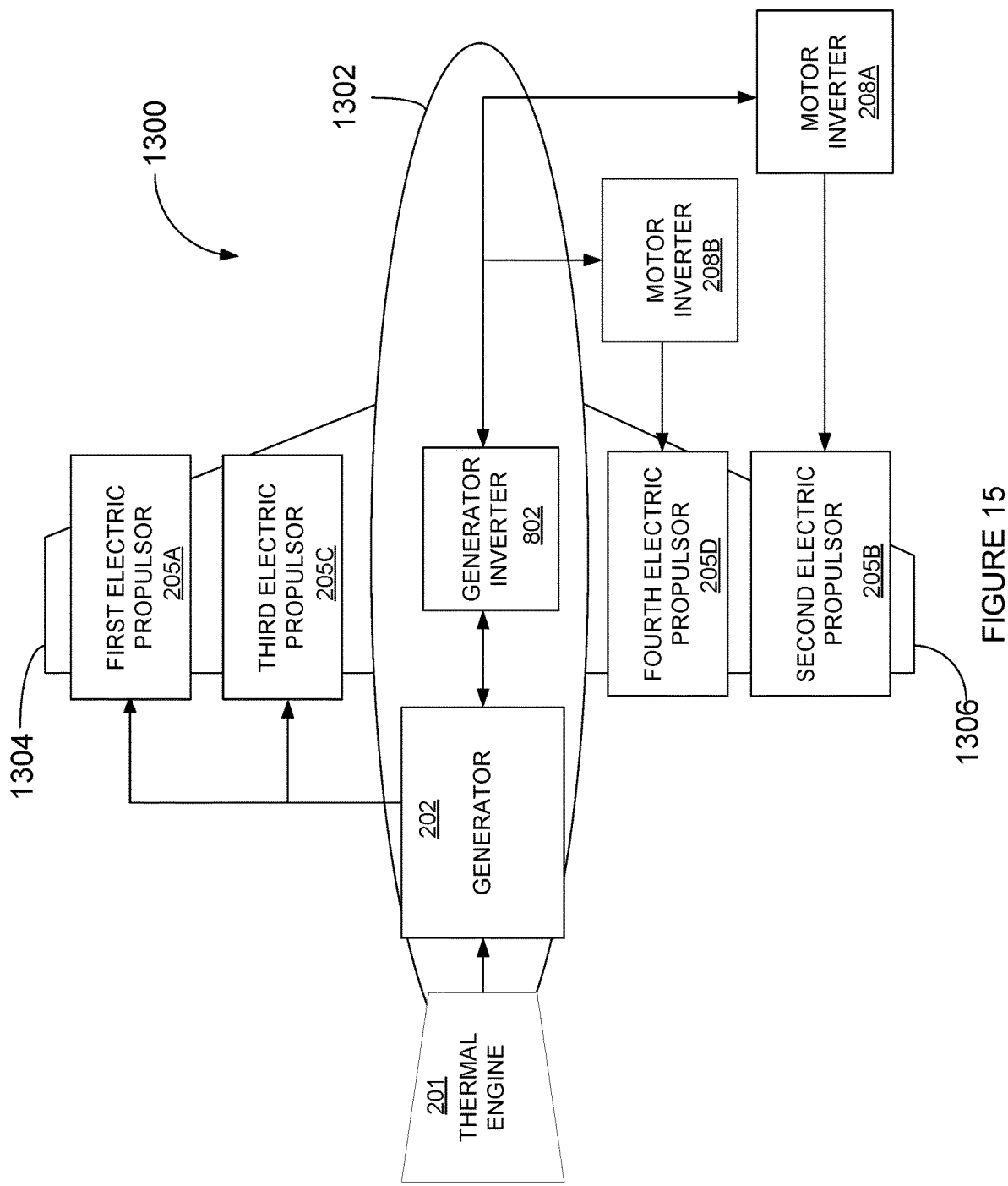
FIG. 15 is a top view of an aircraft having a hybrid electric aircraft propulsion system mounted thereto, in accordance with a third illustrative embodiment.

FIG. 15 is another alternative embodiment of the aircraft 1300 with the hybrid electric aircraft propulsion system mounted thereto. The generator 202 is connected to the first electric propulsor 205*a* and the third electric propulsor 205*c* in an AC-AC configuration. The first electric propulsor 205*a* and the third electric propulsor 205*c* are mounted to the first wing 1304. The generator 202 is connected to the second electric propulsor 205*b* and to the fourth electric propulsor 205*d* in an AC-DC-AC configuration. The second electric propulsor 205*b* and the fourth electric propulsor 205*d* are mounted to the second wing 1306. The AC-AC subsystems are thus provided on one wing 1304 and the AC-DC-AC subsystems are provided on another wing 1306. The generator inverter 802 and the motor inverters 208*a*, 208*b* may be mounted to the wings 1304, 1306 or to the fuselage 1302.

For simplicity, the battery 210 and any connection/disconnection mechanisms are not illustrated in FIGS. 13-15. However, it should be understood that any of the embodiments described herein, such as but not limited to those illustrated in FIGS. 8 to 12, may be applied to the embodiments of FIG. 13-15. For example, the motor inverters 208*a*, 208*b* of FIG. 14 may be selectively connected to the first electric propulsor 205*a* and the third electric propulsor 205*c*, respectively.

In some embodiments, the third rotating structure 206*c* of FIG. 7 is provided with any of the embodiments of FIGS. 8 to 15. In some embodiments, the dual stator motors 204*a*, 204*b* of FIG. 5 are provided with any of the embodiments of FIGS. 8 to 15. In some embodiments, the relays 314*a*, 314*b*, 314*c*, 314*d*, 314*e*, 314*f* of FIG. 6 for selectively connecting a motor inverter to a first motor stator, a second motor stator, or both motor stators, are provided with any of the embodiments of FIGS. 8 to 15.

In some embodiments, the various architectures for the hybrid electric aircraft propulsion system 200 are used to address possible failures within the system 200. Various examples of failure modes are described below.

Based on the embodiments of FIGS. 2 to 7, propulsion power for the rotating structure(s) 206 are available via the battery 210 in case of a failure of the thermal engine 201. The available power is however limited by the power & energy capacity of the battery 210 (or aircraft DC bus) and the power rating of the motor inverter(s) 208, 208a, 208b, 308. Similarly, in the case of a generator failure due to a short circuit, propulsion power for the rotating structure(s) 206, 206a, 206b is available via the battery 210, but limited by the capacity of the battery 210 and the power rating of the motor inverter(s) 208, 208a, 208b, 308. In the case of a battery failure, propulsion power is available but limited by the power of the generator 202 and the available fuel for the thermal engine 201.

Based on the embodiments of FIGS. 3 to 7 where there are at least two electric motors 204a, 204b, in the case of a failure to one electric motor 204a, full power is available to the other functional electric motor 204b. In the case of a failure to one motor inverter 208a, full power is available to one electric motor 204b and partial power is available to the other electric motor 204a, limited by the power of the generator 202 and the available fuel for the thermal engine 201. If the two motor inverters 208a, 208b are connected together, then full power may be available to either electric motor 204a, 204b.

Based on the embodiments of FIGS. 4 to 7 where the generator 202 has dual stators 402, 404, in the case of a generator failure due to an open-circuit on one of the two stators 402, 404, full power is available to one of the two electric motors 204a, 204b. Partial power is available to the other one of the two electric motors 204a, 204b, limited by the power and capacity of the battery 210 and the power rating of the motor inverter 208a, 208b associated thereto. In addition, in case of battery depletion, energy from the functioning generator stator can be transferred to the opposite motor through the two motor inverters.

Based on the embodiment of FIG. 5 where each electric motor 204a, 204b has two stators, in the case of a failure to one stator 502a or 504a, some power is still available from the electric motor 204a. If the failure is to stator 502a, power is still available from the battery 210 and is limited by the capacity of the battery 210 and the power rating of the motor inverter 208a associated thereto and the power rating of the remaining motor stator 504a. If the failure is to stator 504a, power is still available from the generator 202 and is limited by the power of the generator 202 and the available fuel for the thermal engine 201 and the power rating of the remaining motor stator 502a.

Based on the embodiment of FIG. 6, if an inverter 208a or 208b fails, full power is still available for the associated electric motor 204a or 204b from the generator stator 402a or 402b with proper relay configuration, limited by generator rating. Similarly, if a generator stator 402a or 402b fails, both motor stators of the associated electric motor 204a or 204b may be powered by the battery 210. The total power available would then depend on the rating of the inverter 208a or 208b and of the battery 210.

Based on the embodiment of FIG. 7, if both electric motors 204a, 204b fail and the aircraft is out of fuel, power from the battery can be transferred to the main shaft of the thermal engine 201 to produce propulsion power for the rotating structure 206c. The motor inverters 208a, 208b may be connected to the generator 202 to act as a motor and add power to the rotating structure 206C and other devices such as pumps that might also be mechanically connected to the rotating structure. If all electric systems fail, the thermal engine 201 can still provide propulsion power for the rotating structure 206c.

Based on the embodiments of FIGS. 8 to 12, if the battery fails, all electric propulsors/electric motors can operate normally.

Based on the embodiments of FIGS. 10 to 12, if the thermal engine fails with the power turbine free to turn, power is available to all four electric propulsors 205a, 205b, 205c, 205d. Using energy from the battery 210, the generator inverter 802 can be used to drive the second generator stator 402b such that the first generator stator 402a will produce energy for the first electric propulsor 205a and the third electric propulsor 205c. The second electric propulsor 205b and the fourth electric propulsor 205d may be driven by the battery 210 via the motor inverters 208a, 208b, respectively. The total power available would then depend on the rating of the inverters 208a, 208b and of the battery 210.

Based on the embodiments of FIGS. 10 to 12, if the thermal engine fails and the power turbine is not free to turn, power is available to the second electric propulsor 205b and the fourth electric propulsor 205d from the battery 210. The total power available would then depend on the rating of the inverters 208a, 208b and of the battery 210.

Based on the embodiments of FIGS. 10 to 12, if the generator inverter 802 fails, the first electric propulsor 205a and the third electric propulsor 205c can operate normally. The second electric propulsor 205b and the fourth electric propulsor 205d may be driven by the battery 210, with total available power being dependent on the rating of the inverters 208a, 208b and of the battery 210.

Based on the embodiments of FIGS. 10 to 12, if the generator 202 fails, the second electric propulsor 205b and the fourth electric propulsor 205d may be driven by the battery 210 via the motor inverters 208a, 208b, respectively. In the case of the embodiment of FIG. 12, the first electric propulsor 205a and the third electric propulsor 205c may also be driven by the battery 210 via the generator inverter 802. The total power available would then depend on the rating of the inverters 208a, 208b and of the battery 210.

Based on the embodiments of FIGS. 10 to 12, if the second generator stator 402b fails, power is available to the second electric propulsor 205b and the fourth electric propulsor 205d from the battery 210. The total power available would then depend on the rating of the inverters 208a, 208b and of the battery 210. The first electric propulsor 205a and the third electric propulsor 205c would operate normally.

Based on the embodiment of FIG. 11, if the first generator stator 402a fails, the first electric propulsor 205a and the third electric propulsor 205c may be driven by the battery 210 through the motor inverters 208a, 208b, respectively. The total power available would then depend on the rating of the motor inverters 208a, 208b and of the battery 210.

Based on the embodiment of FIG. 12, if the first generator stator 402a fails, the first electric propulsor 205a and the third electric propulsor 205c may be driven by the battery 210 through the generator inverter 802. The total power available would then depend on the rating of the generator inverter 802 and of the battery 210.

Figure 16:
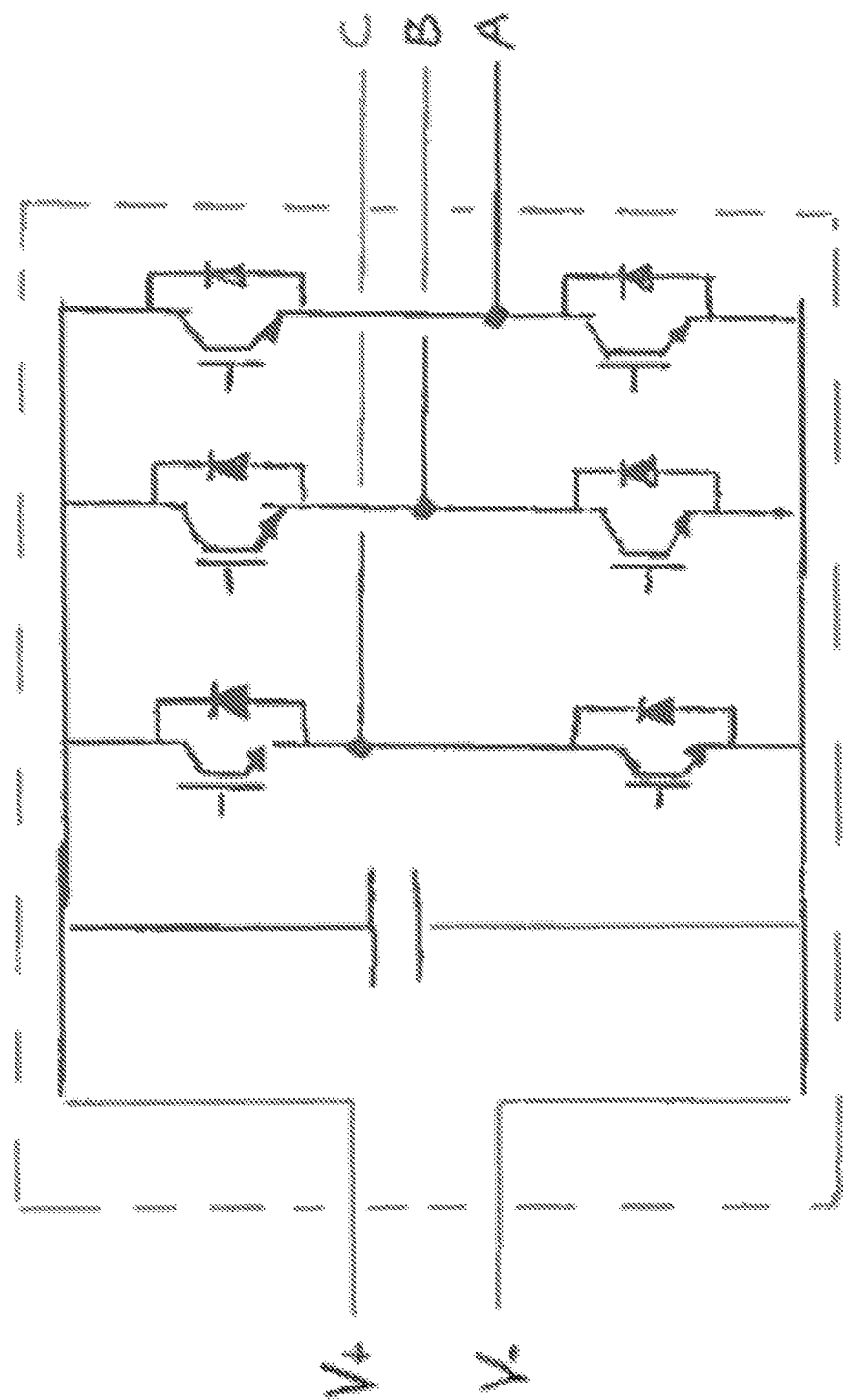
FIG. 16 is a schematic diagram of a motor inverter, in accordance with an illustrative embodiment.

FIG. 16 is an example embodiment of a motor inverter 208. There is illustrated one of many possible embodiments that can be used with the hybrid electric aircraft propulsion system 200 described herein. Lines V+ and V− are connected to the positive and negative terminals of the battery 210. Lines A, B, C are connected to an electric motor 204, and represent the three phases of the AC electric power provided thereto.

Figure 17:
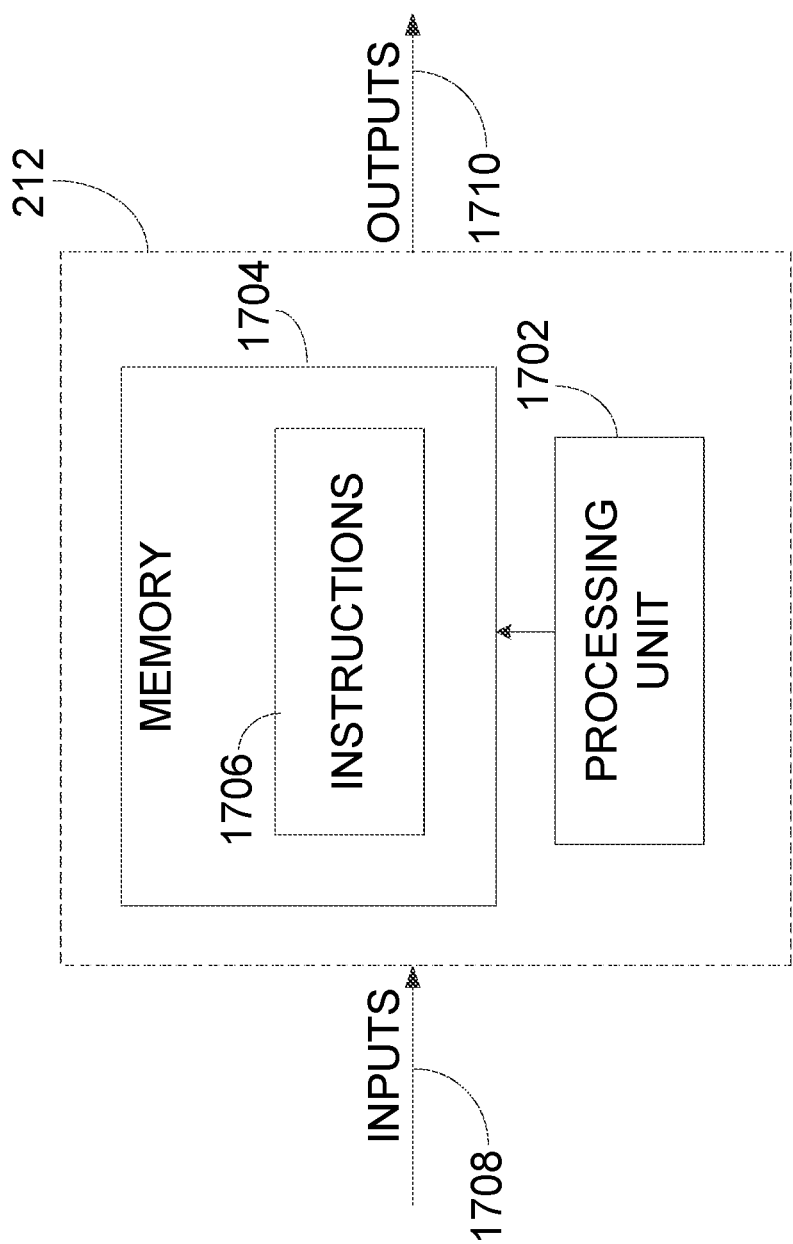
FIG. 17 is a block diagram of an example controller, in accordance with an illustrative embodiment.

With reference to FIG. 17, there is illustrated an example embodiment of controller 212, comprising a processing unit 1702 and a memory 1704 which has stored therein computer-executable instructions 1706. The processing unit 1702 may comprise any suitable devices configured to implement the system such that instructions 1706, when executed by the controller 212 or other programmable apparatus, may cause the functions/acts/steps as described herein to be executed. The processing unit 1702 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 1704 may comprise any suitable known or other machine-readable storage medium. The memory 1704 may comprise non-transitory computer readable storage medium, for example, but not limited to, an electronic, magnetic, optical, electromagnetic, infrared, or semiconductor system, apparatus, or device, or any suitable combination of the foregoing. The memory 1704 may include a suitable combination of any type of computer memory that is located either internally or externally to the controller 212, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 1704 may comprise any storage means (e.g., devices) suitable for retrievably storing machine-readable instructions 1706 executable by processing unit 1702. Note that the controller 212 can be implemented as part of a full-authority digital engine controls (FADEC) or other similar device, including electronic engine control (EEC), engine control unit (EUC), and the like.

The methods and systems described herein may be implemented in a high level procedural or object oriented programming or scripting language, or a combination thereof, to communicate with or assist in the operation of a computer system, for example the controller 212. Alternatively, the methods and systems may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 1702 of the controller 212, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A hybrid electric aircraft propulsion system comprising:
   a thermal engine;
   a generator coupled to the thermal engine, wherein the generator comprises a first generator stator for powering the first electric propulsor and a second generator stator for powering the second electric propulsor;
   a first electric propulsor operatively connected to the generator to receive alternating current (AC) electric power therefrom;
   a second electric propulsor;
   a third electric propulsor operatively connected to the first stator generator to receive AC electric power therefrom;
   a fourth electric propulsor;
   a generator inverter operatively connected to the generator to convert AC electric power to direct current (DC) electric power;
   a first motor inverter operatively connected to the generator inverter and selectively connected to one of the first electric propulsor and the second electric propulsor and configured to receive the DC electric power and provide the first electric propulsor and the second electric propulsor with AC electric power, respectively; and
   a second motor inverter connected between the generator inverter and the fourth electric propulsor to convert DC electric power to AC electric power and provide the AC electric power to the fourth electric propulsor;
   wherein the first generator stator is selectively connected to one of the first electric propulsor and the third electric propulsor.

2. The system of claim 1, wherein the generator inverter and the first motor inverter are operatively connected to a DC power source.

3. The system of claim 1, wherein the second motor inverter is selectively connected to the fourth electric propulsor and the third electric propulsor.

4. The system of claim 1, wherein the generator inverter is selectively connected to one of the second generator stator, the first electric propulsor, and the third electric propulsor.

5. The system of claim 1, wherein the first electric propulsor and the second electric propulsor are configured for mounting to a first wing of an aircraft, and wherein the third electric propulsor and the fourth electric propulsor are configured for mounting to a second wing of the aircraft.

6. The system of claim 1, wherein the first electric propulsor and the third electric propulsor are configured for mounting to a first wing of an aircraft, and wherein the second electric propulsor and the fourth electric propulsor are configured for mounting to a second wing of the aircraft.

7. The system of claim 1, wherein the first electric propulsor is configured for mounting to a first wing of an aircraft, and wherein the second electric propulsor is configured for mounting to a second wing of the aircraft.

8. A method for operating a hybrid electric aircraft propulsion system, the method comprising:
generating a first source of alternating current (AC) electric power from a generator and providing the AC electric power from the generator to a first electric propulsor, wherein the first source of AC electric power is generated from a first generator stator of the generator, and the second source of AC electric power selectively from a second generator stator of the generator, and wherein the first source of AC electric power is selectively provided to the first electric propulsor and a third electric propulsor;
generating a second source of AC electric power from the generator;
converting the second source of AC electric power into direct current (DC) electric power at a generator inverter;
reconverting the DC electric power into the second source of AC electric power at a first motor inverter;
selectively providing the second source of AC electric power to a second electric propulsor and the first electric propulsor from the first motor inverter;
providing, from the generator inverter, the DC electric power to a second motor inverter;
reconverting the DC electric power into the second source of AC electric power at the second motor inverter; and
providing the second source of AC electric power to a fourth electric propulsor from the second motor inverter.

9. The method of claim 8, further comprising providing DC electric power to the first motor inverter and to the generator inverter from a DC power source.

10. The method of claim 8, further comprising selectively providing the second source of AC electric power to the third electric propulsor and the fourth electric propulsor from the second motor inverter.

11. The method of claim 8, further comprising:
disconnecting the generator from the first electric propulsor;
applying the second source of AC electric power from the first motor inverter to the first electric propulsor while the generator is disconnected;
adjusting power to the first electric propulsor by the first motor inverter so as to match a frequency of the first electric propulsor to a frequency of the generator; and
reconnecting the generator to the first electric propulsor.

12. The method of claim 8, further comprising disconnecting the generator inverter from the generator and connecting the generator inverter to one of the first electric propulsor and the third electric propulsor.

13. The method of claim 12, further comprising:
disconnecting the generator from the one of the first electric propulsor and the third electric propulsor;
applying the second source of AC electric power from the generator inverter to the one of the first electric propulsor and the second electric propulsor;
adjusting power to the one of the first electric propulsor and the third electric propulsor so as to match a frequency of the one of the first electric propulsor and the third electric propulsor with a frequency of the generator; and
reconnecting the generator to the one of the first electric propulsor and the third electric propulsor.

14. The method of claim 12, further comprising resynchronizing a frequency of the one of the first electric propulsor and the third electric propulsor with a frequency of the generator by modulating and applying the second source of AC electric power from the generator inverter to the one of the first electric propulsor and the third electric propulsor.

15. The method of claim 8, further comprising resynchronizing a frequency of the first electric propulsor with a frequency of the generator by modulating and applying the second source of AC electric power from the first motor inverter to the first electric propulsor.

16. An aircraft comprising a hybrid electric aircraft propulsion system, the system comprising:
a thermal engine;
a generator coupled to the thermal engine, wherein the generator comprises a first generator stator for powering the first electric propulsor and second generator stator for powering the second electric propulsor;
a first electric propulsor operatively connected to the generator to receive alternating current (AC) electric power therefrom;
a second electric propulsor;
a third electric propulsor operatively connected to the first stator generator to receive AC electric power therefrom;
a fourth electric propulsor;
a generator inverter operatively connected to the generator to convert AC electric power to direct current (DC) electric power;
a first motor inverter operatively connected to the generator inverter and to the second electric propulsor and configured to receive the DC electric power and provide the second electric propulsor with AC electric power; and
a second motor inverter connected between the generator inverter and the fourth electric propulsor to convert DC electric power to AC electric power and provide the AC electric power to the fourth electric propulsor;
wherein the first generator stator is selectively connected to one of the first electric propulsor and the third electric propulsor.

* * * * *